United States Patent
Cooper

(10) Patent No.: US 6,823,516 B1
(45) Date of Patent: Nov. 23, 2004

(54) SYSTEM AND METHOD FOR DYNAMICALLY ADJUSTING TO CPU PERFORMANCE CHANGES

(75) Inventor: Barnes Cooper, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/371,751

(22) Filed: Aug. 10, 1999

(51) Int. Cl.[7] .............................................. G06F 9/46
(52) U.S. Cl. ...................................... 718/108; 718/104
(58) Field of Search ................................ 713/300–340; 709/100, 108, 102

(56) References Cited

U.S. PATENT DOCUMENTS

| | | | |
|---|---|---|---|
| 5,027,273 A | | 6/1991 | Letwin .................... 364/200 |
| 5,319,772 A | | 6/1994 | Hwang .................... 395/550 |
| 5,453,904 A | | 9/1995 | Higashiyama et al. ...... 361/103 |
| 5,475,324 A | | 12/1995 | Tomiyori .................... 327/145 |
| 5,485,147 A | * | 1/1996 | Jaffe et al. ............... 340/825.5 |
| 5,511,205 A | * | 4/1996 | Kannan et al. ............. 713/324 |
| 5,760,636 A | * | 6/1998 | Noble et al. ................ 307/117 |
| 5,852,731 A | * | 12/1998 | Wang et al. ................ 709/100 |
| 5,903,599 A | | 5/1999 | Johnson et al. ............. 375/219 |
| 5,909,594 A | * | 6/1999 | Ross et al. .................... 710/20 |
| 5,913,068 A | * | 6/1999 | Matoba ....................... 713/322 |
| 5,928,322 A | * | 7/1999 | Bitar et al. ................. 709/103 |
| 5,994,844 A | * | 11/1999 | Crawford et al. ........... 315/151 |
| 6,055,577 A | * | 4/2000 | Lee et al. .................... 709/233 |
| 6,098,123 A | * | 8/2000 | Olnowich ..................... 710/31 |
| 6,118,306 A | * | 9/2000 | Orton et al. .................. 327/44 |
| 6,131,166 A | * | 10/2000 | Wong-Insley ............... 713/300 |
| 6,219,742 B1 | * | 4/2001 | Stanley ...................... 710/260 |
| 6,272,642 B2 | * | 8/2001 | Pole et al. .................. 713/300 |
| 6,412,021 B1 | * | 6/2002 | Nguyen et al. ............. 719/318 |
| 6,418,535 B1 | * | 7/2002 | Kulakowski et al. ....... 713/320 |

OTHER PUBLICATIONS

*Advanced Configuration and Power Interface Specification*, Intel Microsoft Toshiba, Revision 1. 0b, 323 p., (Feb. 2, 1999).

* cited by examiner

Primary Examiner—David Wiley
Assistant Examiner—Joseph E. Avellino
(74) Attorney, Agent, or Firm—Schwegman, Lundberg, Woessner & Kluth, P.A.

(57) ABSTRACT

In a computer system having a processor capable of operating at a plurality of performance states, including a first and a second performance state, wherein while the processor operates in any of the performance states it executes tasks at an expected processing performance, a system and method for dynamically adjusting to transitions between the first and second performance states. A determination is made that a performance state change is needed and a transition is initiated. The system halts task scheduling, measures CPU performance at the new performance state and resumes task scheduling within the constraints of the new performance state. The system also adjusts tasks as a function of CPU performance within the new performance state, wherein adjusting includes notifying each task of the transition between performance states.

25 Claims, 11 Drawing Sheets

SYSTEM AND METHOD FOR DYNAMICALLY ADJUSTING TO CPU PERFORMANCE CHANGES

FIELD OF THE INVENTION

The present invention is related to computing systems, and more particularly to a system and method for adjusting to changes in processor performance.

BACKGROUND INFORMATION

Designers of mobile computing platforms are faced with a delicate balance. They seek to increase performance of the CPU but at the same time limit the power consumed in order to conserve battery life and limit the heat generated by the system. As part of this balancing act mobile systems often rely on software-controlled thermal management systems in order to operate efficiently within a varying group of thermal constraints. For instance, a specification may define two or more thresholds that indicate temperatures at which different forms of software-controlled thermal management are activated. Active objects may be used to define a temperature threshold for a given thermal zone. When this threshold is exceeded, the operating system activates an active device (e.g., a fan or a remote heat exchanger), or reduces the battery charge current.

Historically, CPUs have had a discrete operating point, characterized by a given frequency and power. The frequency is typically some multiple of the external clock delivered to the CPU; the power dissipated by the CPU is a function of the core frequency and voltage applied to the CPU. As the applied voltage level is increased, advanced processing technologies allow for the core frequency to be increased, resulting in a nonlinear increase in power consumption.

Mobile systems typically operate at the lowest voltage and frequency pair required to keep the typical dissipated power below mobile battery-powered limits. Because voltage can be increased to deliver higher performance for a given component, desktop CPUs typically deliver higher performance than their mobile counterparts at any given point in time.

Systems have been proposed which use passive thresholds to define a temperature at which the power of one or more CPUs should be reduced in order to cool a given thermal zone. In the Advanced Configuration and Power Interface (ACPI) model, the operating system varies the CPU duty cycle so the power dissipation of the CPU matches the power dissipation capabilities of the system. See, *Advanced Configuration and Power Interface (ACPI) Specification*, Revision 1.0., published by Intel, Microsoft and Toshiba in 1997. This type of thermal management is termed "throttling" or "passive cooling. To support throttling, the ACPI model defines registers that allow the operating system to control the duty cycle of the CPU.

Throttling reduces the heat generated by the mobile computing platform but does so without regard for processing efficiency. What is needed is a system and method for reducing power generation without throttling the CPU.

SUMMARY OF THE INVENTION

In a computer system having a processor capable of operating at a plurality of performance states, including a first and a second performance state, wherein while the processor operates in any of the performance states it executes tasks at an expected processing performance, a system and method is described for dynamically adjusting to transitions between the first and second performance states. A determination is made that a performance state change is needed and a transition is initiated. The system halts task scheduling, measures CPU performance at the new performance state and resumes task scheduling within the constraints of the new performance state. The system also adjusts tasks as a function of CPU performance within the new performance state, wherein adjusting includes notifying each task of the transition between performance states.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
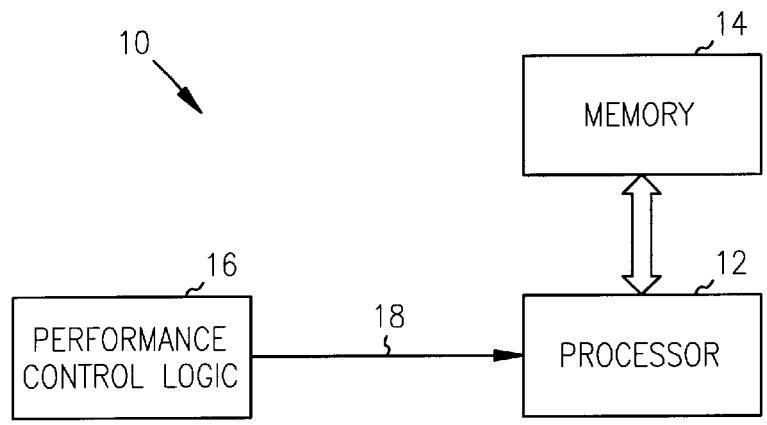
FIG. 1 illustrates a computer system having enhanced thermal management characteristics.

A computer system 10 with enhanced thermal management characteristics is shown in FIG. 1. System 10 includes a processor 12 connected to a memory 14 and to performance control logic 16. In one embodiment, performance control logic 16 places processor 12 in one of a plurality of discrete performance states by manipulating performance control input 18. Each of the performance states provides a certain level of processor performance while executing user threads.

The presence of a plurality of performance states allows a given processor 12 to operate at increased performance levels in mobile systems when additional active cooling can be provided by the system. A CPU with performance state transition support is capable of dynamically switching between two or more discrete operating points (voltage/frequency pairs) by altering the bus ratio multiplier or the core voltage. The operating system is responsible for managing these transitions to deliver the maximum performance possible while ensuring that battery life, thermal constraints and system integrity are not compromised.

To ensure stable transitions, in one embodiment, performance state transitions can only occur across resets. In another embodiment, however, performance state transitions are permitted to occur on either reset or by entering a quiescent state such as deep sleep. In yet another embodiment, performance control logic 16 is designed to permit transitions while the CPU is running. Such an approach may require additional logic to prevent race conditions and other sources of instability.

Figure 2A:
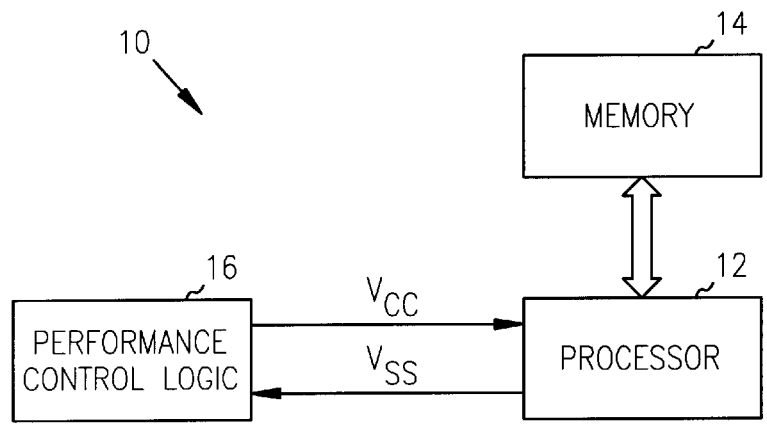
FIG. 2a illustrates a processor which shifts between performance dates as a function of a voltage level supplied by the performance control logic.
Figure 2B:
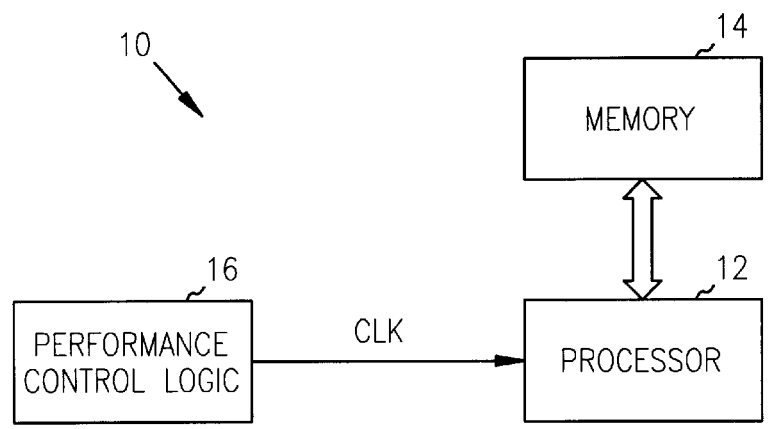
FIG. 2b illustrates a processor which shifts between performance dates as a function of a frequency of a periodic wave form applied to its clock input.

In one embodiment, as is shown in FIG. 2a, processor 12 shifts between performance states as a function of a voltage level applied to the power input ($V_{cc}$) of processor 12. In another embodiment, as is shown in FIG. 2b, processor 12 shifts between performance states as a function of the frequency of a periodic waveform applied to the clock input (CLK) of processor 12.

Figure 2C:
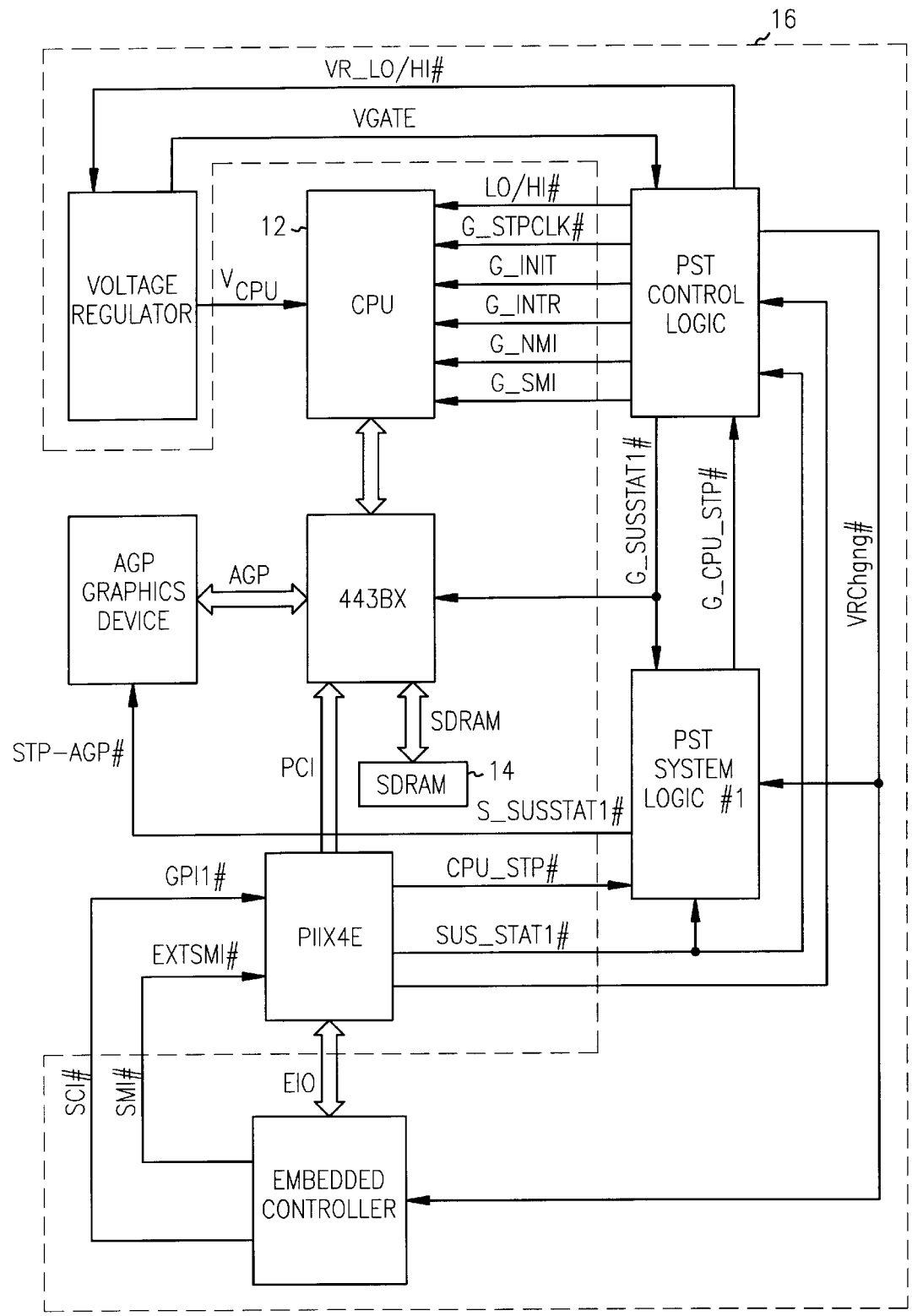
FIG. 2c illustrates a processor which shifts between performance dates as a function of both voltage level and clock frequency.

In a third embodiment, processor 12 shifts between performance states both as a function of a voltage level applied to the power input of processor 12 and as a function of the frequency of a periodic waveform applied to the clock input of processor 12. One such embodiment is shown in FIG. 2c. In the third embodiment, performance states are defined as core frequency and voltage pairs, and are made possible through the use of voltage reduction technology. By increasing the core voltage, a processor 12 can operate at higher frequencies. In one such embodiment, the performance state of processor 12 can be increased to desktop levels of performance (and power consumption). Such platforms therefore must be equipped with enhanced thermal capabilities in order to dissipate power generated at the highest performance states. At the same time, system 10 also requires enhanced power supply capabilities in order to effectively move between power supply voltages.

In another embodiment, performance control logic 16 provides a continuous range of voltage levels and adjusts the performance level of processor 12 as a function of a voltage level or a clock frequency supplied by performance control logic 16.

Finally, in one embodiment, performance control logic 16 simply modifies the core frequency to bus frequency ratio seen by processor 12, in order to move to a different performance state.

In one embodiment, performance control logic 16 includes circuitry that allows the CPU performance to be altered while the computer is functioning. In one such embodiment, logic 16 alters the performance of the CPU by changing the bus to core ratio that is latched from signals IGGNE#, A20M#, LINT0#, LINT1# during a hard processor reset. This allows the processor to run at different core frequencies depending upon the available system power in a mobile computer depending upon the amount of active cooling that can be accommodated given the system power constraints. Note that the external bus frequency is not altered, simply the internal core frequency is changed. In addition, in order to run at faster speeds (essentially above 100%), the voltage is altered in addition to the bus ratio. This works in accordance with voltage reduction technology that allows a given processor to run at higher frequency when a higher voltage is applied. The side result, is that the power dissipated increase in a roughly cube-law fashion with increases in performance.

For example, a mobile system might run at 300/100 (CPU core frequency/frontside bus frequency) while on battery, at 350/100 while the AC adapter is inserted, and at 400/100 while docked. This allows the notebook computer to operate at desktop performance levels when it is connected to a docking station that can provide the additional cooling needed to dissipate the additional CPU power.

In one embodiment, processor 12 includes a hard reset capability used to perform state transitions. This means that for this embodiment, the entire processor state and L1/L2 cache state is lost. In order to accommodate dynamic performance state transitions, for one such embodiment, the system firmware makes this reset and all of its associated side effects transparent to the operating system.

In one embodiment, performance transitions are governed by a cache protection mechanism and by a transition control/status mechanism. The cache protection mechanism is used by the operating system to protect the CPU's caches during a performance state transition. The transition control/status mechanism includes a set of registers used to initiate transitions between different performance states, as well as to determine the current CPU performance state. In addition, in one embodiment, a separate voltage control is provided for moving between voltage levels at the processor. In one such embodiment, the voltage control includes separate voltage sequencing which operates under control of the operating system.

To operate correctly in systems having performance state transition capability, the operating system must deal with the changes in processor performance. In situations where the operating system uses an internal time-stamp counter to implement software delays for device drivers, changes in the CPU core frequency may cause proportionate charges in the time-stamp counter, thereby altering the delay generated by the operating system function, and possibly causing device driver failure due to timing parameter violation. The operating system should take this into account when performing a performance state transaction.

In addition, allowing performance state transitions drastically alters the CPU performance (i.e. MIPS). This is not a problem for normal applications, where a task will simply take less or more time depending upon the amount of CPU bandwidth. It is, however, a problem for real-time applications. Real-time applications typically have a requirement of a certain amount of instruction throughput per time quantum (i.e. MIPS/millisecond). As a result, technology will alter the MIPS of the processor. In one embodiment, therefore, a mechanism is defined to notify each process using real-time threads to adjust to the new processor performance.

Figure 3:
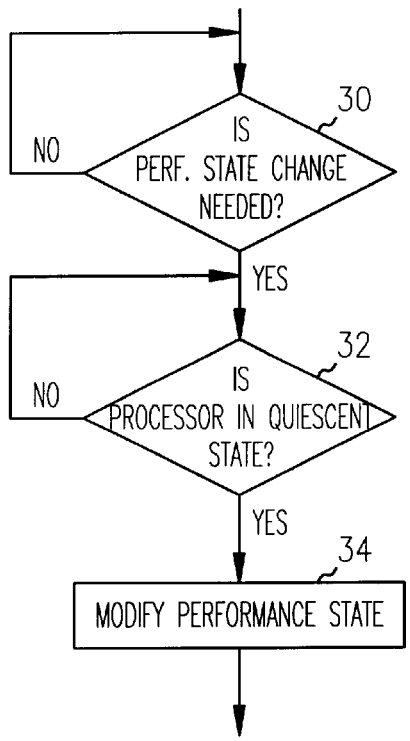
FIG. 3 illustrates a process for switching between performance dates.

In one embodiment, processor 12 is limited to switching performance states only during relatively quiescent states. In one such embodiment, as can be seen in FIG. 3, at 30 a determination is made as to whether a performance state change is needed. If not, control remains at 30. If, however, a determination is made that a performance state change is needed, control moves to 32 and system 10 waits for processor 12 to enter a quiescent state. When the processor enters a quiescent state, control moves to 34 and performance control logic 16 moves processor 12 to a new performance state. In one embodiment, performance control logic 16 ensures that processor 12 is in a relatively quiescent state by intercepting all interrupts. In another embodiment, processor 12 is taken into a Deep Sleep state to ensure that it is quiescent.

In one embodiment, performance control logic 16 and processor 12 cooperate to provide a plurality of performance states. In one embodiment, system 10 includes a low power state and a high performance state. Low power state is used to conserve battery power and reduce heat generated by system 10. High performance state provides the highest processing state possible given the power supply and thermal capabilities of system 10. In another embodiment, system 10 includes a plurality of high performance states covering a range of processing performance.

Performance state transitions introduce three potential software issues that must be addressed. The first issue is that these transitions dramatically change the performance of the CPU, which requires an accurate implementation of software timing methodologies. The second issue is that these transitions affect the ability of the system to accurately execute real time threads. The third issue is that these transitions induce additional latency into the operating system transition.

Software Timing Issues

As noted above, the fact that a processor 12 has a plurality of performance states does not necessarily give rise to software timing issues. If, for example, the performance level is set at boot time and never changed, there will be no software timing problems due to the fact that processor 12 has a plurality of performance states, as this is no different than booting the system with a different performance CPU. However, when the CPU performance level is increased or decreased while the system is running (e.g., during AC insertion or removal), several operating system and application software issues must be considered.

Software timing is critical for many operations, particularly when the software communicates directly with the hardware (e.g., device drivers, SMI code, BIOS). For these cases, timeouts are typically needed to guarantee that the minimum time constraints are met. In other words, the delay is expected to be at least some specified minimum value (it could be more). In order to implement delays of this nature, poorly written software may rely upon sections of code that have been timed either at boot time or (even worse) during the software development cycle. These sorts of timing loops are extremely primitive and can exhibit wildly varying actual timing values depending upon CPU performance, CPU throttling, background task execution requirements, and interrupt handler CPU demands. This type of code uses the following algorithm to calibrate a timing loop:

1) Read and save CPU speed independent timer (e.g., 8254 PIT timer zero)
2) Loop a fixed number of times on a delay code fragment (same code fragment as used in delay routine)
3) Read CPU speed independent timer
4) Subtract timer read of #1 from timer read of #3 to indicate elapsed time
5) Divide elapsed times by number of loops to indicate time per loop
6) Store time per loop in memory for later use A delay routine such as above calculates the number of loops required to implement the requested timing delay values by dividing the time requested by the time per loop. Although primitive, this delay provides a minimum constrained delay in non-performance-state-enabled systems. However, this type of delay poses a problem for performance-state-enabled systems because the system may be calibrated at the low power performance level, and then transition to a higher performance state during runtime. Because the software is not notified of the CPU performance change, it does not get a chance to recalibrate, and as a result the delays could be shortened below some minimum timeout value. This situation can result in failure if the minimum timing (e.g., a timeout used for a hardware device to become ready) causes device failure. Clearly, this sort of timing delay methodology should be discouraged.

The next type of timing delay is accomplished by reading a hardware register directly and calculating the elapsed time between successive reads. This delay is calibrated by calculating the known frequency of the timer. The code then performs reads of the current time to delay some predetermined amount of time (TimePerTick×NumberOfTicks= TotalTime). The following sequence of the steps is performed to generate a delay using this technique (assuming count up timer):

1) Read and save initial timer value
2) Divide requested time delay by timer tick granularity
3) Add timer ticks of step 2 to initial timer value of step 1
4) Read timer value until timer value of step 4 is above or equal to timer value needed of step 3

This type of timing mechanism can generate CPU-speed independent delays if the timer itself is CPU speed independent. One system timer that is not CPU speed independent is the CPU Time Stamp Counter, which is incremented at the internal core clock frequency. If operation of the CPU Time Stamp Counter is modified as a function of performance state, this type of timing delay implementation is not recommended for Performance-state-enabled systems.

Computer systems have been designed using architectures that provide one or more CPU-speed independent mechanisms for implementing timing delays in software. The operating system should use one of these CPU-speed independent mechanisms in order to provide robust APIs with solid timing services for performance-state-enabled platforms. Some examples of CPU-speed independent mechanisms available in, for instance, architectures designed by Intel Corporation are as follows:

Programmable Interval Timer 0 (IRQ0)
Real-Time Clock Periodic Rate Interrupt (IRQ8)
ACPI Power Management Timer (SCI)

Timing services based upon these or other CPU-speed independent mechanisms will not become inaccurate as a result of transitions between performance states.

Real Time Threads

Figure 4A:
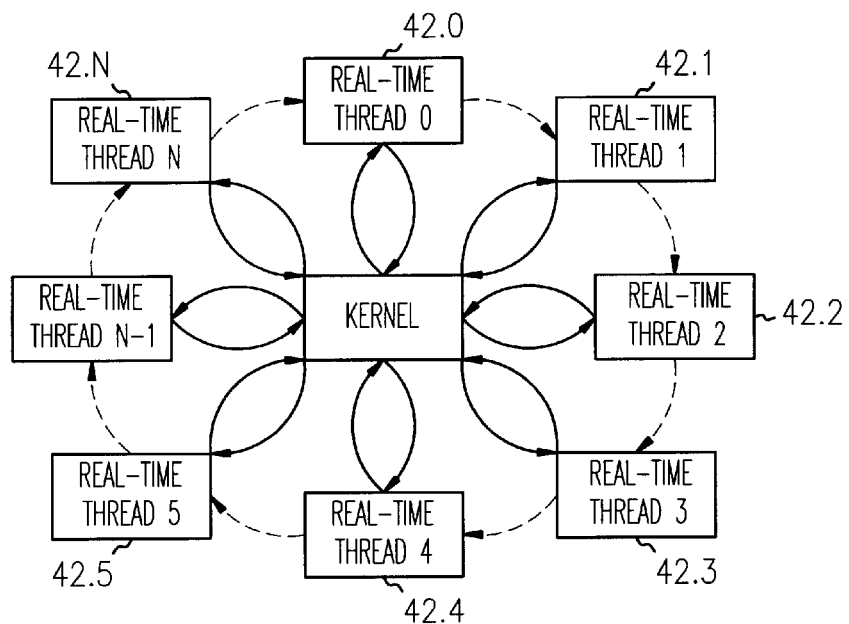
FIG. 4a illustrates a round robin execution scheme which can be used to divide available performance.

Multitasking operating systems work by dividing the bandwidth of the processor across one or more threads of execution. Preemptive multitasking allows each thread to execute for some amount of time, and then the operating system moves onto to some other thread waiting to be executed. Typically, threads of execution are scheduled by means of a priority-based scheme, and typically, real-time threads receive nearly the highest priority. Because of their nature, real-time threads cannot afford to be delayed or interrupted for any length of time without losing data, dropping frames, or performing poorly (depends upon application). In addition, real-time threads must have a means for determining the available system bandwidth at boot, in order to gauge the amount of processing they can safely perform during each iteration of their execution. The diagram shown in FIG. 4a depicts a simple round-robin execution scheme where kernel 40 simply divides the available performance (minus some percentage for overhead) across the number of real-time threads (42.0-42.n) to be scheduled.

For example, if there were ten threads and processor had a sustained bandwidth of 100 MIPs with a scheduling interrupt of 1ms, the kernel could allocate approximately 0.1 MIPS per millisecond, with a 10 ms interval.

Performance state transition technology requires that the operating system define a communication mechanism between threads to communicate the available bandwidth at any given time. This method requires that a software notification mechanism be defined by the operating system. In one embodiment, this is implemented as a Notify0 operation in an ACPI-compliant operating system, such that it can easily be called under system firmware's control. Upon invocation of this method, in one embodiment the operating system performs the following actions shown in FIG. 4b.

At 45, the operating systems halts task scheduling. Control then moves to 46, where the operating system measures CPU performance. In one embodiment, CPU performance is a function of CPU internal frequency and the effective CPU bandwidth (i.e. MIPS). Control then moves to 47, where the operating system resumes task scheduling. Control then moves to 48, where the operating system adjusts software delay routines to new CPU internal frequency, and to 49, where the operating system calculates an allotted bandwidth per unit time and notifies each process of the performance change.

Figure 4B:
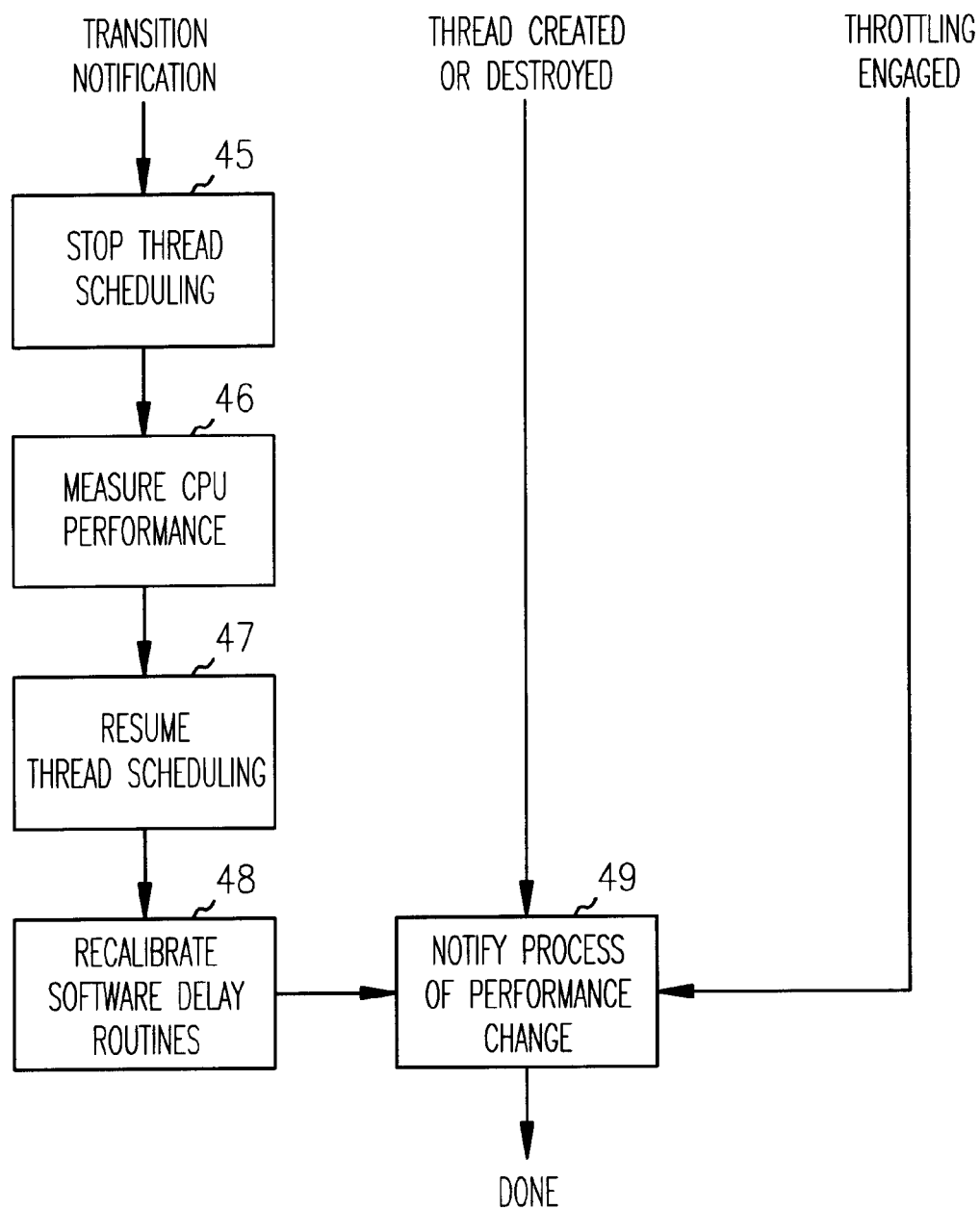
FIG. 4b illustrates dynamic rescaling of real-time threads.

By using this process, the operating system can dynamically adjust to changes in processor performance resulting from threads being created or destroyed, or by actual changes in performance resulting from thermal throttling, performance state transition, or other means. In order for this approach to be effective real-time threads should have the ability to rescale dynamically. The block diagram shown in FIG. 4b depicts the paths that each of the three different usage models use.

This method allows an operating system to dynamically adjust to changing CPU performance, and provides support for performance state transition technology.

Latency Due to Performance State Transitions

Another software visible impact of a performance-state-enabled approach is that transitions between performance states hold off CPU operation for the duration of time it takes to switch between the performance states. This induces additional latency into the operating system transition that, if of long enough duration, could cause operating system failure. Care must therefore be taken to limit the latency due to performance state transitions.

In one embodiment, the latency due to performance state transitions is limited to no more than approximately two hundred microseconds. Since operating systems currently operate with latencies which approach or even exceed this amount of performance state transition latency, such latency should not cause any appreciable problems for today's operating systems and peripheral demands. (The following events can induce latencies that may approach or even exceed the duration of performance state transition latencies: shared interrupt processing (e.g., PCI interrupt determination), coincident interrupt processing (probable net sum of masked ISR service time), CPU throttling (e.g., 244 microseconds), C2 State Exit Latency (e.g., 50 microseconds), C3 State Exit Latency (e.g., 1 millisecond) and SMI Event Processing (e.g., 500 microseconds).)

Managing Multiple Performance States

In one embodiment, processor 12 includes configuration control. In one such embodiment, objects are added to a configuration specification in order to allow for operating system control of processor performance states. For example, objects can be added to the ACPI specification described above.

In yet another embodiment, transitions between performance states is controlled via a separate driver added to an existing operating system. In one WINDOWS 98® embodiment, the driver operates processor 12 in the most desirable processor state based on, for instance, receipt of WINDOWS 98® operating system WDM power state messages.

In yet another embodiment, transitions between performance states are managed by means of the system management interrupt (SMI) handler. This embodiment will be discussed in more detail below.

Finally, in one embodiment, the system BIOS sets the proper performance state during the power on self-test (POST). In one such embodiment, the proper performance state is selected based on user setup options. In another such embodiment, the proper state is a function of an external parameter (such as the state of the AC adapter or detection of the docking station).

A method of shifting between performance states under operating system control is described next. In order to transition between CPU states, the system firmware must determine if system 10 does, in fact, have a plurality of performance states. In one embodiment, this is determined by reading a model-specific register. In one embodiment, the model-specific register includes a transition enable bit used to indicate if processor 12 is able to switch between performance states and a state bit indicating which of two performance states processor 12 will boot into.

In another embodiment, the single state bit is replaced by a state field having two or more state bits encoding three or more states into which processor 12 can transition. In one such embodiment, the state field values are indices into a table incorporated into system ROM, such that the system BIOS can determine the actual CPU speed based on these values.

In one embodiment the transition enable bit indicates whether the CPU will switch between two internal bus core ratios upon exit from a quiescent or a Deep Sleep state based upon an input selection signal labeled HI/LO#.

In order to provide maximum flexibility and allow for easy rectification of any potential end-user problems, in one embodiment system 10 includes two BIOS setup options for processor performance configuration: Static Performance State Transition (SPST) Enable/Disable and Dynamic Performance State Transition (DPST) Enable/Disable. Static Performance State Transition Enable/Disable allows an end user to completely disable performance state transitions if any problems are experienced or if additional power dissipation is not desired, even when connected to the AC adapter. This setup option, therefore, transforms a performance-state-enabled system into a normal mobile system. (In other words, the platform should boot in the Low Power State, should not report performance state transition capabilities to the operating system (either through ACPI or other means), and should return a performance state transition disable code to the operating system.

In one embodiment, a Dynamic Performance State Transition Enable/Disable is provided for problem resolution purposes only. This allows an end-user to turn off dynamic switching between performance states in the event that the software and/or hardware configuration experiences abnormalities or failures as a result of performance state transitions. In one embodiment, when Dynamic Performance State Transition is enabled, the system BIOS loads the performance state transition ACPI objects into the ACPI tables, and enables the system SMI-handler to dynamically switch between performance states.

If this option is set to disabled, but performance state transitions are still enabled by the end user, in one embodiment the system BIOS performs a static assignment of the state. In one such embodiment, the system BIOS samples the system state and places the CPU into the appropriate state just prior to boot. In this case, system 10 boots in the Low Power State or the High Performance State, and returns a transition-disabled code to the driver. In addition, system 10 may suppress reporting of performance transition capabilities to the operating system (either through ACPI or by any other means).

In addition to evaluating the CPU's capabilities as well as the user's preferences, in one embodiment the system BIOS determines if the platform is capable of supporting performance state transitions. Whatever method the OEM chooses to determine this, it is critical that it be fail-safe. Attempting a performance state transition without the appropriate system electronics hardware in place can result in operating system failure. In one embodiment, when the system BIOS determines that both the CPU and system electronics can support performance state transitions, it can proceed with one of several possible sequences:

First, if performance state transitions are disabled, the system BIOS defaults to the disabled state, i.e., no action is required. This means that all system firmware components can assume that the system is a mobile system without performance state transition enhancements. These components include, but are not limited to, the following components: a) system BIOS firmware that performs a static performance state transition; b) system BIOS firmware that loads ACPI tables into memory; c) system management firmware that manages performance state transitions when not in ACPI mode; d) embedded controller firmware that assists with performance state transitions; and e) system management firmware that communicates with the operating system performance state transitions drivers (if any).

Second, if performance state transitions are enabled for static operation but disabled for dynamic operation, the system BIOS does not perform any performance state transition notifications to the aforementioned firmware components, but instead simply samples the system state and sets the proper CPU operating state during BIOS post. In one embodiment this operation is limited to being performed only on cold boots and not on wake (i.e., resume) events that issue a CPU reset.

Finally, if performance state transitions are enabled for dynamic operation, in one embodiment the system BIOS executes the following sequence:

Assigns initial speed at boot

Notifies system firmware components of performance state transition capability (SMI handler, embedded controller, etc.)

Notifies system thermal management firmware of performance state transition capability Constructs ACPI Objects for performance state transitions Adds the performance state transition ACPI Objects to Secondary System Description Table (SSDT)

Adds a pointer to performance state transition SSDT to RSDT

Figure 5:
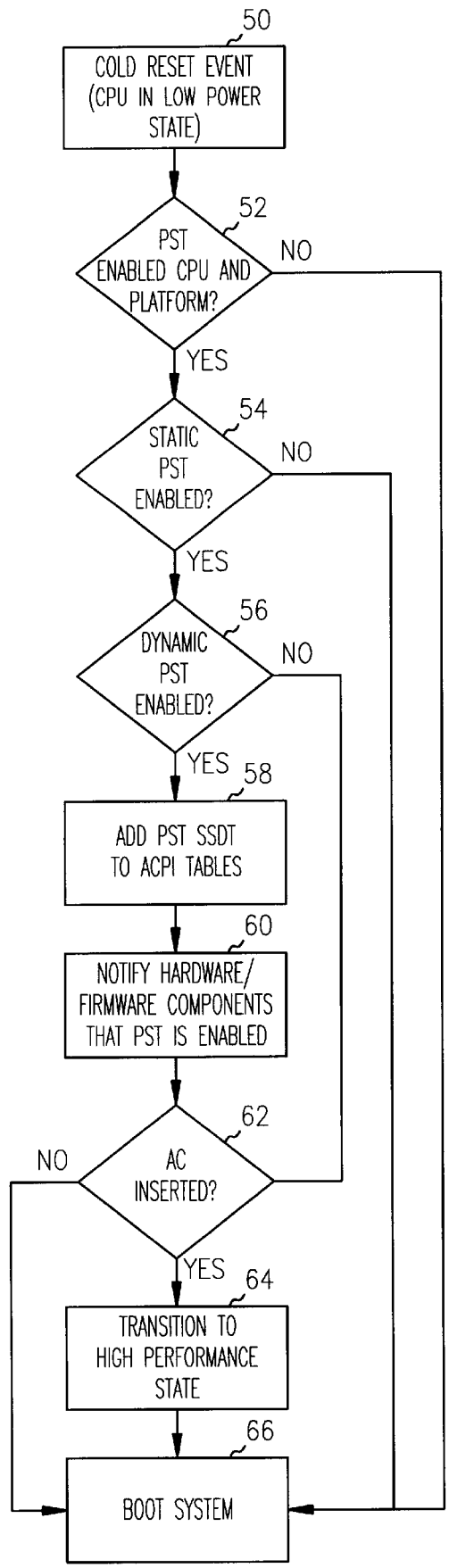
FIG. 5 illustrates a boot process which can be used in a system having performance date transitions.

The system is then bootstrapped as normal. For the situation where an ACPI-operating system is installed and a legacy solution is enabled, in one embodiment the SMI handler immediately ceases to manage performance state transitions after receiving the ACPI enable command from the operating system. FIG. 5 illustrates one embodiment of a boot process which can be used in system having a plurality of performance states.

In the process of FIG. 5, at 50 a cold reset event occurs (e.g., power on). Control moves to 52 where a check is made to determine if system 10 is capable of performance state transitions (PSTs). If not, control moves to 66 and system 10 boots up as a normal mobile system.

If, however, a determination is made at 52 that system 10 is capable of performance state transitions (PSTs), control moves to 54, where a check is made to determine if system 10 is configured for Static Performance State Transitions (SPSTs). If not, control moves to 66 and system 10 boots up as a normal mobile system.

If, however, a determination is made at 54 that system 10 is configured for Static Performance State Transitions (SPSTs), control moves to 56, where a check is made to determine if system 10 is configured for Dynamic Performance State Transitions (DPSTs). If not, control moves to 62.

If, however, a determination is made at 56 that system 10 is configured for Dynamic Performance State Transitions (DPSTs), control moves to 58, where a Performance State Transition SSDT is added to the ACPI tables. Control then moves to 60 where hardware and firmware components are notified that performance state transitions are enabled. Control then moves to 62.

At 62, a check is made to see if system 10 is connected to a power source other than its internal battery (e.g., an external AC or DC power supply). If not, control moves to 66 and system 10 boots up as in the low power performance state.

If, however, a determination is made at 62 that system 10 is connected to a power source other than its internal battery, control moves to 64 and system 10 is configured to boot into a high performance state. Control then moves to 66 and system 10 boots up as in the high performance state.

Regardless of the support model (ACPI, driver or SMI), the transition methodology between performance states remains the same. The following sequence of steps is required for the system firmware (SMI handler or system BIOS), operating system, or driver to perform a transition to another performance state: 1) Software determines that state change is required; 2) Software writes to performance control register state number for new CPU state; 3) Software enables transition events; 4) Software performs a transition event; 5) Hardware transitions CPU; 6) Software reads MSR register and determines if transition was successful; 7) Software repeats steps 1–6 until successful.

For a system 10 that incorporates two states (one Low Power State and one High Performance State), the performance control field can simply consist of one bit. In one embodiment, this is implemented as one general-purpose output connected to a memory- or I/O-mapped register in the CPU's address space. When changed, this output signal causes the performance control logic to initiate a performance state transition on the next level three (i.e., Deep Sleep state) entry. When the software performs this entry, the performance control logic delivers the appropriate signals to the CPU causing it to begin operating at the new performance level. In another embodiment, the performance control logic initiates a performance state transition when processor 12 enters a quiescent state. In yet another embodiment, the transition of one or more bits in the performance control field acts as an interrupt to processor 12. Processor 12 then moves to another performance state as part of the interrupt handling routine.

In another embodiment, a performance-state-enabled CPU changes performance states based upon the state of the LO_HI# input pin when exiting from a quiescent state. Based upon the state of this signal, the CPU selects a new bus ratio, which changes the internal core operating frequency of the CPU. A performance-state-enabled CPU always exits from a hard reset (CPURESET#) in the Low Power State.

In one embodiment, hardware performs the following transition sequence upon a transition event after the performance register value has changed:
1) The system core logic begins to transition the CPU to the quiescent state. (This includes the assertion of STPCLK#, followed by the CPU issuing a stop grant bus cycle, followed by the core logic stopping the CPU input clocks.) If a stop-break event happens to occur before the core logic begins to gate off the CPU clocks, the logic should abort the performance state transition request. This means that an interrupt has occurred nearly concurrently with the performance state transition level three read and should be serviced without adding the performance state transition latency overhead.
2) If a break event does not occur and the core logic successfully transitions the CPU to the quiescent state, the performance control logic takes over. Because the performance control logic changes CPU signals and power supply voltages that can only be changed while the CPU is not running, the control logic gates off critical signals to the CPU in order to ensure that an early break event does not prematurely wake the CPU before the performance state transition is complete.
3) After the CPU voltage and LO_HI# signal have been adjusted to their new levels and have stabilized, the performance control logic ungates the CPU's signals. In the event that an early transition event has occurred while the performance control logic was performing the performance state transition, the control logic ensures that the appropriate timings between the signal transitions are observed (i.e., the control logic ungates the CPU critical signals in a controlled fashion).

As noted above, in one embodiment transitions between performance states are controlled through ACPI objects. In one such embodiment, the system BIOS determines at boot time if performance state transitions are enabled. If so, the system BIOS loads the tables that include the ACPI performance state transition control objects. These objects give the operating system all the information it needs to manage dynamic performance state transitions.

As noted above, the presence of a plurality of performance states allows a given processor 12 to operate at increased performance levels in mobile systems when additional active cooling can be provided by the system. A CPU with performance state transition support is capable of dynamically switching between two or more discrete operating points (voltage/frequency pairs) by altering the bus ratio multiplier and voltage while the CPU is momentarily placed into the quiescent state. In one embodiment the operating system is responsible for managing these transitions (via ACPI mechanisms) to deliver the maximum performance possible while ensuring that battery life and thermal constraints are not compromised. The next section describes the changes needed for the ACPI to properly manage these transitions.

In one embodiment, processor 12 reports its performance state transition capabilities in the ACPI name space and allows the OS to manage transitions between performance states. These transitions are initiated when dynamic insertion or removal events take place (AC, dock, etc.), as abnormal thermal conditions occur, or as other system requirements change. The ACPI name space objects listed below inform the OS of the system's capabilities. These include control mechanism access and system capabilities.

Transitions are controlled by the operating system. In order to perform a performance state transition, the OS first writes the next performance state (in the form of a number) to the Performance State Command Field. This prepares the hardware to perform a performance state transition on the next P_LVL3 read. The P_LVL3 places the CPU in a Deep Sleep state while appropriate logic and power supply changes are made to facilitate operation in the new state. The write to the Performance State Command Field further prepares the hardware to wake up the CPU immediately upon completing the performance state transition. However, the hardware will also wake up the CPU immediately upon any enabled interrupt or bus master request that occurs before the CPU has fully transitioned into the Deep Sleep state.

Once the CPU has transitioned into the Deep Sleep state, performance control logic 16 prevents the CPU from waking up on any bus master requests or interrupts until the transition is completed successfully. Because an early wake event can occur before the transition is complete, the OS must verify if the performance state transition request was successful by reading a CPU model-specific register. In the event that the performance state does not match the requested state, the OS should retry the operation as soon as possible.

In one embodiment three ACPI objects are added to system 10 to support performance state transitions. The three are: Presence Detect (_PD), Supported States (_SS) and Present Capabilities (_PC).

The Presence Detect (_PD) object resides under the processor object present in the ACPI namespace. This object includes the following two pieces of information: a descriptor for the performance control field and a pointer to a model-specific register (MSR) inside the processor 12. The descriptor for the performance control field points to a specific register in memory or I/O space that the OS writes in order to initiate a transition between different CPU states. In one embodiment, this consists simply of one bit (signifying two states) tied to a general-purpose output on the chipset. This object includes a bit field position and a bit field size that further define the exact operation region for the OS to write in order to configure the performance control logic properly. The OS should preserve all other bits within this field as they will be used for other critical system control and are likely to be manipulated by system ACPI Machine Language (AML) code. In one embodiment, the OS is responsible for synchronizing accesses to this region to ensure that coincident read/modify/write cycles from multiple threads of execution do not result in register corruption.

After the OS writes to the performance control field to prepare the system for a performance state transition, it then masks interrupts, enables bus master break events, and performs a level three read. The hardware detects that the CPU is in the Deep Sleep state, and transitions the CPU to the requested performance state.

In the event that an unmasked interrupt occurs coincident with the level three read, processor 12 does not transition to the Deep Sleep state, and the performance control logic does not perform the performance state transition. As a result, the operating system must read the CPU performance state after waking up from a performance state transition request to ensure that the transition was successful. The second piece of information in the Presence Detect object is used for exactly this purpose. It is a pointer to a model-specific register (MSR) inside the CPU that reflects the current operating point of the CPU. This pointer contains an index, bit offset, and bit field size values such that the OS can read and then isolate the region of interest within the MSR.

The Supported States (_SS) object resides under the processor object present in the ACPI namespace, and indicates the performance state transition capabilities of the system. Each _SS object present in the system is formatted as a package of packages. There can be any number of packages inside each _SS object, each of which corresponds to a particular CPU operating point. The _SS object lists all of the CPU performance states that a given platform is ever capable of entering. The _SS object does not indicate which objects are available at the current time. Each package contained within the _SS object lists at most one Low Power State, and at least one High Performance State. The Low Power State is defined to be the state with the lowest level of power consumption. Any other states listed within the _SS object are considered High Performance States.

In one embodiment, the packages within the _SS objects representing each processor state are ranked in descending order by power consumption. By using this convention, the OS can then assume that the first entry represents the highest-performing High Performance State, and the last entry represents the Low Power State. Any objects in between represent additional High Performance States.

Each internal package within the _SS object represents a different performance state and includes the following four pieces of information: the internal core frequency of the performance state, the typical power dissipation of the performance state, the value to write to the performance control field and the MSR data read value.

The first number in the _SS object is the internal core frequency of the performance state. Because the core frequency represents the internal CPU clock rate for each state, it indicates the theoretical maximum relative performance (based upon linear increase in performance with no external bus cycles) that can be achieved by switching between states. The base value of the number may or may not have any physical meaning, but the ratio of numbers between states indicates (on average) the relative performance difference between the two states being compared.

The second number in each package is the typical power dissipation of the performance state. This is the average power consumed only by processor 12. One can also expect that the power consumption of the supporting components (e.g. graphics, memory controller) will increase as the CPU performance increases.

The third piece of information is the value to be written to the performance control field in order to facilitate a state transition on the next level three read. The OS performs a read/modify/write of the performance control field using this data pattern in order to attempt a transition to that particular performance state.

The last piece of information contained in each entry is the MSR data read value. This is the value that the OS compares against the value read from the CPU's MSR indicating the current performance state. This comparison allows the OS to determine if a transition was successful, as well as to determine what the initial CPU performance state is after the system is switched into ACPI mode. Note that the OS cannot assume anything about the initial performance state of the CPU. The system management handler manages each performance state transition until the OS issues the ACPI enable command to the ACPI command port. At this point, the SMI handler will cease all power management and thermal management activities, and will perform no further CPU performance transitions (CPU could be in either the Low Power State or a High Performance State). As a result of this, the OS should read the CPU's MSR value pointed to by the PD object after transitioning the system to ACPI mode and then compare it against the _SS CPU states in order to determine the initial boot speed.

The Present Capabilities (_PC) method dynamically reports the number of High Performance States that the system can support at any given time. This is accomplished by referring to the numbering scheme used by the _SS object. The High Performance State (with the highest power dissipation) is assigned number zero, while each additional High Performance State (ranked in descending order by power dissipation) is assigned a higher number until reaching the Low Power State which is given the number 'n'. The _PC method simply returns the number of the state that is currently available, which allows the OS to use the highest performance state that is indicated by _PC, as well as any higher numbered (lower power) state. In order to indicate to the OS that the _PC returned value has changed, AML code in the system will be responsible for issuing a Notify event to the _PC object.

The following sequence shows the steps required to change between performance states:

1) OS reads register defined by Command Field Resource Descriptor
2) OS clears read value starting at bit offset for bit field size 3) OS performs logical OR of desired new state value at bit offset for bit field size
4) OS writes modified value to register defined by Command Field Resource Descriptor
5) OS performs P_LVL3 read
6) CPU enters Deep Sleep state
7) Performance control logic immediately wakes up CPU upon transition completion, interrupt, or bus master request
8) OS reads MSR (64-bits) indicated by _PD
9) OS compares value at MSR bit offset for MSR bit field size to expected value (from _SS)
10) OS determines if transition was successful and repeats steps 5–9 if not.

Figure 6:
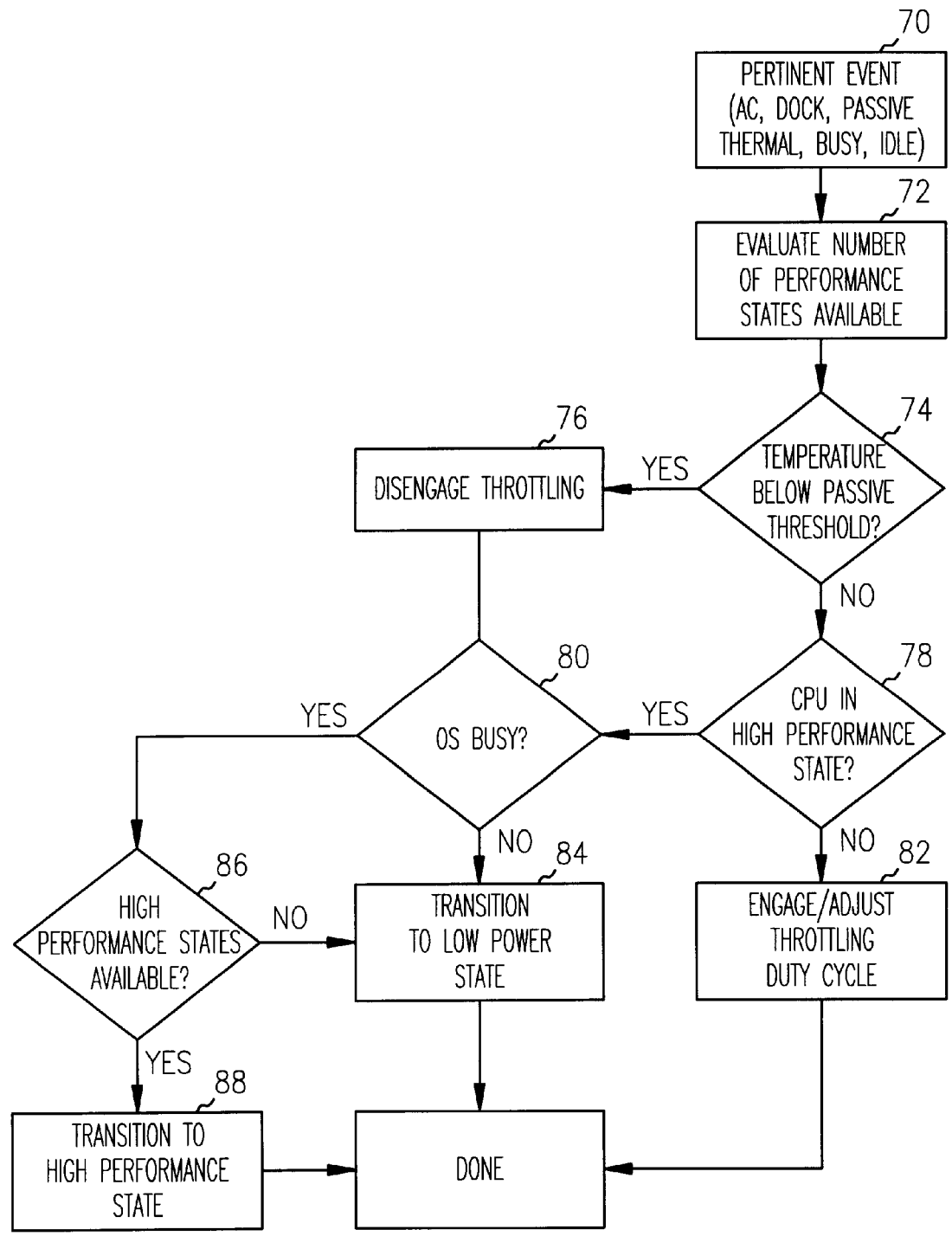
FIG. 6 illustrates an example operating system policy scheme for managing performance date transitions.

The flowchart in FIG. 6 illustrates an example operating system policy scheme for managing performance state transitions under the ACPI model. As can be seen in FIG. 6 at 70, a pertinent event occurs such as connecting to an AC power supply, docking, passive thermal threshold, busy, idle. Control then moves to 72 where processor 12 evaluates the number of performance states available. Control then moves to 74 where a determination is made whether the temperature of system 10 is below a passive threshold. If so, control moves to 76 and throttling is disengaged. Control then moves to 80.

If at 74, a determination is made that the temperature is not below the passive threshold, control moves to 78 and a determination is made whether the CPU is in a high performance state. If so, control moves to 80. If not, however, control moves to 82 and the heat generated by the CPU is reduced through throttling.

At 80, a determination is made whether the operating system is busy. If not, the operating system at 84, transitions the CPU to the lowest power state.

If, at 80, a determination is made that the operating system is busy, control moves to 86 and a determination is made as to whether high performance states are available. If not, control moves to 84 and the operating system transitions the CPU to the lowest power state. If, however, a determination is made at 86 that high performance states are available, control moves to 88 and the CPU transitions to one of the higher performance states.

In an alternate embodiment, system 10 implements three registers that allow the OS to perform transitions between different performance states: Performance Control Registers #1 and 2 (PERF_CNT1 and PERF_CNT2) and a Performance Status (PERF_STS) register.

In one such embodiment, Performance Control Register #1 is a write-able register which allows the OS to write the desired next state to the hardware control mechanism. The next state value is then latched by the hardware until software performs a read of Performance Control Register #2 (PERF_CNT2) in order to initiate the transition to the requested state. The Performance Status register is a read-only register that returns the current CPU performance state.

In one embodiment, system 10 provides information to the OS indicating the cache protection mechanism to be used. In some designs, it is necessary to momentarily place the CPU in a non-operational state while the performance transition occurs. In this case, it might be that the processor is unable to respond to cache snoop cycles from external agents or other CPUs. To protect the integrity of the cache, in one embodiment the processor performance transition can optionally be protected by a cache flush and disable operation, or by a disable of the bus master arbiter. If the cache flush and disable mechanism is used, the OS first disables the cache (through a CPU specific mechanism), writes back and invalidates the contents, performs the transition, and enables the cache once the transition has completed. If the bus master arbiter mechanism is used, the OS first disables the bus master arbiter by setting the ACPI-defined PM2_CNT.ARB_DIS bit, performs the transition, and then clears the PM2_CNT.ARB_DIS bit.

In one embodiment, system 10 includes separate voltage controls which operate under control of the operating system. In one such embodiment, the operating system initiates voltage transitions as a separate operation in order to support changing the CPU's voltage while the system is running. Such an approach can potentially allow the duration of the actual transition sequence to be reduced. In one such embodiment, system 10 includes a write-able Performance Voltage Control Register (PERF_VCNT) and a readable Performance Voltage Status Register (PERF_VSTS). The Performance Voltage Status Register indicates when the voltage regulator has adjusted the voltage to the new target voltage. Because in such an embodiment the CPU is operational as the voltage changes, it will be necessary to sequence voltage transitions very carefully. Therefore, in one embodiment the OS initiates a voltage transition prior to a transition to a higher performance state, and initiates a voltage transition after a transition to a lower performance state. (This is because it is expected that the CPU cannot operate at a higher performance state without the higher voltage applied for that state.) In an embodiment having the registers discussed above, the OS first writes to the PERF_VCNT register to select the new voltage level and then wait for the voltage level to stabilize as indicated by a read of the PERF_VSTS register.

In one such embodiment, six ACPI objects are associated with processor performance control. Such an approach provides more flexibility than the three object embodiment described above. In one embodiment, the six objects are located under the processor object (\_PR) in system 10. In one multiprocessor embodiment, each processor has dedicated processor performance control registers, and corresponding, dedicated, processor performance control objects, in order for processor performance management to be enabled by the operating system.

In one embodiment, the Performance Cache Control (_PCC) object is a named object that indicates the type of cache protection that is required by the platform design. The Performance Cache control object includes three possible values to be reported: no cache protection required, bus master arbiter disable, and cache flush/disable. Under no cache protection required, the OS simply performs a transition while hardware ensures the transition does not effect cache coherency. Under bus master arbiter disable, the OS uses the ACPI-defined arbiter disable bit to turn off external bus masters while the performance transition is performed. (NOTE: This cannot be used in a multi-processor environment.) Under cache flush/disable, the OS disables the CPU's caches, writes back any dirty lines, and invalidates all lines prior to performing the transition. After completing the transition, the OS re-enables the CPU's caches.

The Performance Control Registers (_PCR) object includes pointers to the three registers directly involved with controlling a performance transition. These registers (PERF_CNT1, PERF_CNT2, and PERF_STS) are described within the -PCR object in the form of ACPI descriptors. PERF_CNT1 and PERF_CNT2 may or may not be at the same physical location. The OS uses these registers to control the actual performance transition.

The Performance Voltage Control Registers (_PVR) object includes pointers to the two registers involved with separate voltage control. In one embodiment, this object is optional; including it, however, indicates to the OS that separate voltage control is required. The two registers (PERF_VCNT and PERF_VSTS) are described within the _PVR object in the form of ACPI descriptors.

The Performance Supported States (_PSS) object is a package of packages describing all of the processor performance states that the given platform can support at any point in time. Each package within the object describes a particular performance state and contains six parameters: frequency, power, performance control value, voltage control value and voltage status value.

Frequency is the core frequency of the processor performance state in megahertz (MHZ). The OS uses this value to determine the relative performance difference between this and other performance states.

Power is the typical power dissipation of the processor performance state in milliwatts (mW). The OS uses this value to determine the efficiency of each state in order to adjust the demand threshold for making a transition to higher or lower performance states.

Performance Control Value is a value to write to the Performance Control Register #1 (PERF_CNT1) to initiate a transition to a particular performance state. The OS uses this value to prepare the hardware to perform a transition to a different performance state.

Performance Status Value is the value returned in the Performance Status Register (PERF_STS) to determine if the processor is in this particular performance state. The OS uses this value at initialization time to determine the initial processor performance state, and at runtime after transitions in order to verify that a performance transition was successful.

Voltage Control Value is the value to write to the Performance Voltage Control Register (PERF_VCNT) to initiate a transition to this voltage setting. When separate voltage control is required, the OS uses this value to write to the voltage control register in order to initiate a voltage transition.

Voltage Status Value is the value returned in the Performance Voltage Status Register (PERF_VSTS) to determine if the processor is at this particular voltage setting. The OS uses this value in order to ensure that the voltage is stable before initiating an actual performance transition.

The Performance Transition Latency (_PTL) object indicates to the OS the maximum amount of time that a performance transition requires on the given platform design. This value indicates the amount of time the processor is unavailable after initiating the performance transition sequence. Latency is not reported for separate voltage controls (if so equipped), because the processor is available during separate voltage control transitions. A time larger than 500-microseconds effectively disables processor performance control functionality.

The Performance Present Capabilities (_PPC) object is a method that dynamically returns the number of performance states that the platform is capable of supporting at any given time. This allows the platform to reduce or increase the number of available performance states based upon critical hardware dependencies. The OS immediately transitions out of a performance state that becomes unavailable as indicated by the _PPC method.

In one embodiment, when the OS desires to perform a transition to a new power state, it must first evaluate the system's present capabilities via the _PPC object. This tells the OS how many of the possible states are available at the present time. The OS then chooses the appropriate state based upon many factors, including system workload, thermal conditions, user preference, user cooling policy, and bandwidth requirements.

Once the OS has decided to initiate a performance transition, the OS protects the processor's caches, if needed, by disabling the bus master arbiter, or by disabling, writing back, and invalidating the processor's caches. The OS then retrieves the object in the _PSS package that describes that state, and writes the control value to the PERF_CNT1 register. The OS then performs a read of the PERF_CNT2 register to initiate the transition. Upon resuming instruction execution, the OS then reads the PERF_STS register and compares it to the status field in the PSS object for that state in order to determine if the transition was successful. If the operation was unsuccessful, the OS will retry the operation at a later time.

In addition, if a _PVR method is present, the OS manages separate CPU voltage controls. For instance, the OS increases the voltage prior to initiate a change to a higher performance state, and reduces the voltage only after performing a change to a lower performance state. This ensures that the CPU never runs at voltage that is lower than specified for a given frequency.

Each of these ACPI objects is described in more detail below.

The Performance Cache Control (_PCC) Object describes the cache control mechanism that is to be used by the operating system surrounding a performance transition. The object is a method that returns the type of cache protection mechanism that should be used by the OS. It has the format:

```
Method (_PCC)
{
    . . .
}
Arguments:
    None
Returned Value:
    Type of cache control required:
        0 = No cache protection required
        1 = Bus master arbiter disable
        2 = Cache flush/disable
```

If the method returns a value of zero, it indicates that the platform does not need the OS to initiate any form of cache protection mechanism. No cache protection mechanism is required if the CPU is able to respond to cache snoop cycles while the transition is occurring.

If the method returns a value of one, it indicates that the OS should use the bus master arbiter bit to protect the CPU's caches. The bus master arbiter bit (ARB_DIS) is located in the least-significant bit of the PM2_CNT register. The OS will set this bit to one, thereby preventing any bus master traffic from occurring prior to initiating a performance transition. The OS will clear this bit immediately after completing a performance transition to allow bus masters to once again receive bus ownership.

If the method returns a value of two, it indicates that the OS should use the cache flush/disable method to protect the CPU's caches. In this case, the OS will disable, write-back and invalidate all lines in the CPU's caches (in a processor architecture specific manner) prior to initiating a performance transition. In this manner, the CPU's caches are kept coherent by ensuring that they are completely invalid after completing the transition. The OS will immediately re-enable the CPU's caches after completing a performance transition.

The Performance Control Register (_PCR) Object describes the registers used to initiate a performance transition. This object contains descriptors that describe the three registers (PERF_CNT1, PERF_CNT2, PERF_STS) directly involved with controlling the CPU performance state.

```
Name (hd —PCR, ResourceTemplate( )
{
  Performance Control Register #1 (PERF_CNT1) Resource Descriptor,
  Performance Control Register #2 (PERF_CNT2) Resource Descriptor,
  Performance Status Register (PERF_STS) Resource Descriptor
}
```

The OS writes to the PERF_CNT1 register to prepare the hardware for a performance transition. The value written to this register is encoded for each state supported by the platform, and is reported in the _PSS object as the PerfControl value. Once PERF_CNT1 is setup, the OS reads from the PERF_CNT2 register to initiate the actual transition. Lastly, the OS will read the PERF_STS register to determine if the transition was successful. The value returned in the PERF_STS register is also encoded and is reported in the _PSS object as the PerfStatus value.

The Performance Voltage Control Register (_PVR) Object is used to optionally describe the registers used to initiate separate voltage transitions. This object contains descriptors that describe the two registers (PERF_VCNT, PERF_VSTS) directly involved with controlling the CPU voltage.

```
Name (_PVR, ResourceTemplate( )
{
  Performance Voltage Control Register (PERF_VCNT) Resource
    Descriptor,
  Performance Voltage Status Register (PERF_VSTS) Resource
    Descriptor,
}
```

The OS writes to the PERF_VCNT register to initiate the voltage transition. Voltage transitions are optional, and are only performed when a _PVR object is included in the ACPI tables. By definition, voltage transitions occur prior to transitions to higher performance states, and after transitions to lower performance states. This is done to ensure that the processor never operates at a voltage that is lower than that required for a given operating point. If this object is not included, the OS will assume that the hardware controls the voltage as part of the actual transition itself.

If separate voltage control is indicated (via the presence of the _PVR object), the OS first writes to the PERF_VCNT register to begin the voltage transition. Once this value is written, in one embodiment the hardware immediately begins changing the voltage to the new operating point. The value written to this register is encoded for each state supported by the platform, and is reported in the _PSS object as the VoltControl value. Once PERF_VCNT is setup, the OS will wait for the voltage to settle as indicated by the PERF_VSTS register. The value returned in the PERF_VSTS register is also encoded and is reported in the _PSS object as the VoltStatus value.

The Performance Supported States (_PSS) Object indicates to the OS the number of supported performance states that any given system can support. This object resides underneath all processor objects in an enabled system, and indicates the number of states supported by the platform. This object is a packaged list of information about available performance states, including internal CPU core frequency, typical power dissipation, control register values needed to transition between performance and voltage states, and status register values that allow the OS to verify performance transition and voltage status. The list is sorted in descending order by typical power dissipation. As a result, the 'zeroth' entry describes the highest performance state and the 'nth' entry describes the lowest performance state.

```
Name (_PSS, Package( )
{
  Package( ) {CoreFreq0, Power0, PerfControl0, PerfStatus0,
    VoltControl0, VoltStatus0 },
  Package( ) {CoreFreq1, Power1, PerfControl1, PerfStatus1,
    VoltControl1, VoltStatus1 },
    . . .
  Package( ) {CoreFreqN, PowerN, PerfControlN, PerfStatusN,
    VoltControlN, VoltStatusN}
})
```

Each entry contains six pieces of data. CoreFreqI indicates the core CPU operating frequency (in MHZ) for state I. PowerI indicates the typical power dissipation (in miliwatts) for state I. PerfControlI indicates the value to be written to the Performance Control Register One (PERF_CNT1) in order to initiate a transition to performance state I. PerfStatusI indicates the value that the OS will read from the Performance Status Register (PERF_STS) and compare against to ensure that the performance transition to state I was successful. VoltControl indicates the voltage value to be written to the Performance Voltage Control Register (PERF_VCNT) in order to initiate a transition to voltage state I. VoltStatusI indicates the value the OS will read from the Performance Voltage Status Register (PERF_VSTS) and compare against to ensure that the voltage transition to state I was successful. If separate voltage control is not needed, the VoltControl and VoltStatus entries can be omitted.

The Performance Transition Latency (_PTL) Object indicates to the OS the maximum amount of time that a performance transition can require. The time indicates the maximum amount of time that the processor is unavailable, as measured from the point at which the OS initiates the performance transition (via a write to the PERF_CNT1 register, followed by a read of the PERF_CNT2 register), until the point at which the processor resumes instruction execution. The value is returned in microsecond units and must be less than 500 in order for the OS to enable processor performance control functionality.

This value does not indicate the time required for optional voltage transitions, as separate voltage transitions (by definition), do not halt instruction execution. As a result, the OS is free to schedule other tasks and handle processor interrupts while a separate voltage transition is in progress.

```
Method (_PTL)
{
  . . .
}
Arguments:
    None
Returned Value:
    Maximum transition latency (microseconds)
```

The Performance Present Capabilities (_PPC) Object is a method that dynamically indicates to the OS the highest performance state that is currently supported by the platform. This object resides under each processor object in an enabled system. In one embodiment, this method returns a number that indicates the number of the highest performance state that the OS can use at a given time. The OS may choose the state returned by the _PPC method or any lower power (higher numbered) state. As dynamic events occur, the platform can use the ACPI machine language notify operator pointed to system processor object to cause the OS to reevaluate the number of states available and take action.

```
Method (_PPC)
{
    . . .
}
Arguments:
    None
Returned Value:
    Highest power state currently available:
        0 = state 0_n available (all states available)
        1 = state 1_n available
        2 = state 2_n available
        . . .
        n = state n available
```

In order to support dynamic changes of (_PPC object, processor objects in such an embodiment should support Notify events of type 0x80. Notify events of type 0x80 should cause the OS to reevaluate any _PPC objects residing under that particular processor object. This allows AML code to notify the OS when the number of supported states has changed as a result of an asynchronous event (power source change, thermal condition, dock event, etc.).

Figure 7A:
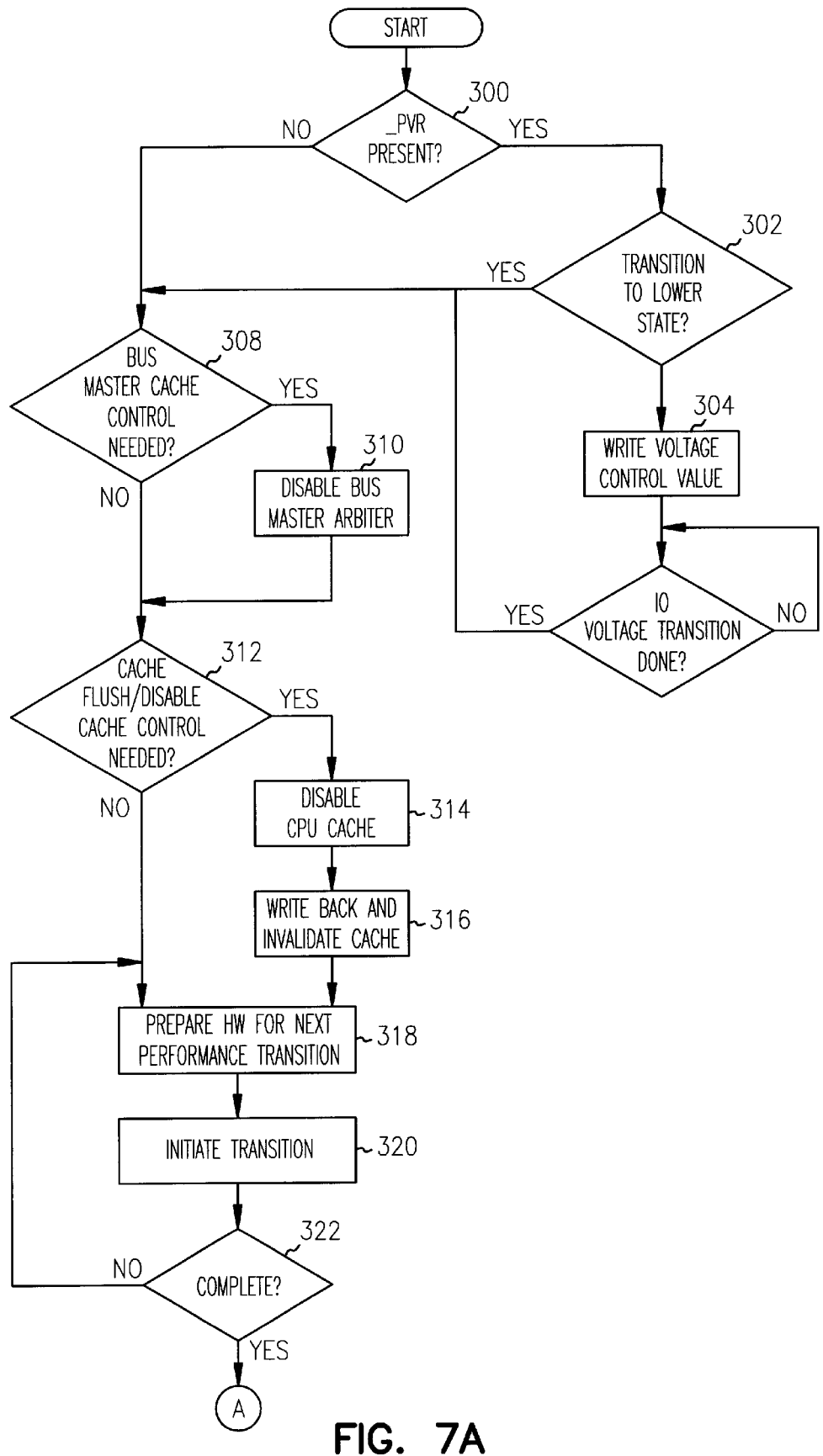
FIGS. 7a and 7b illustrate one method of transitioning between performance states.
Figure 7B:
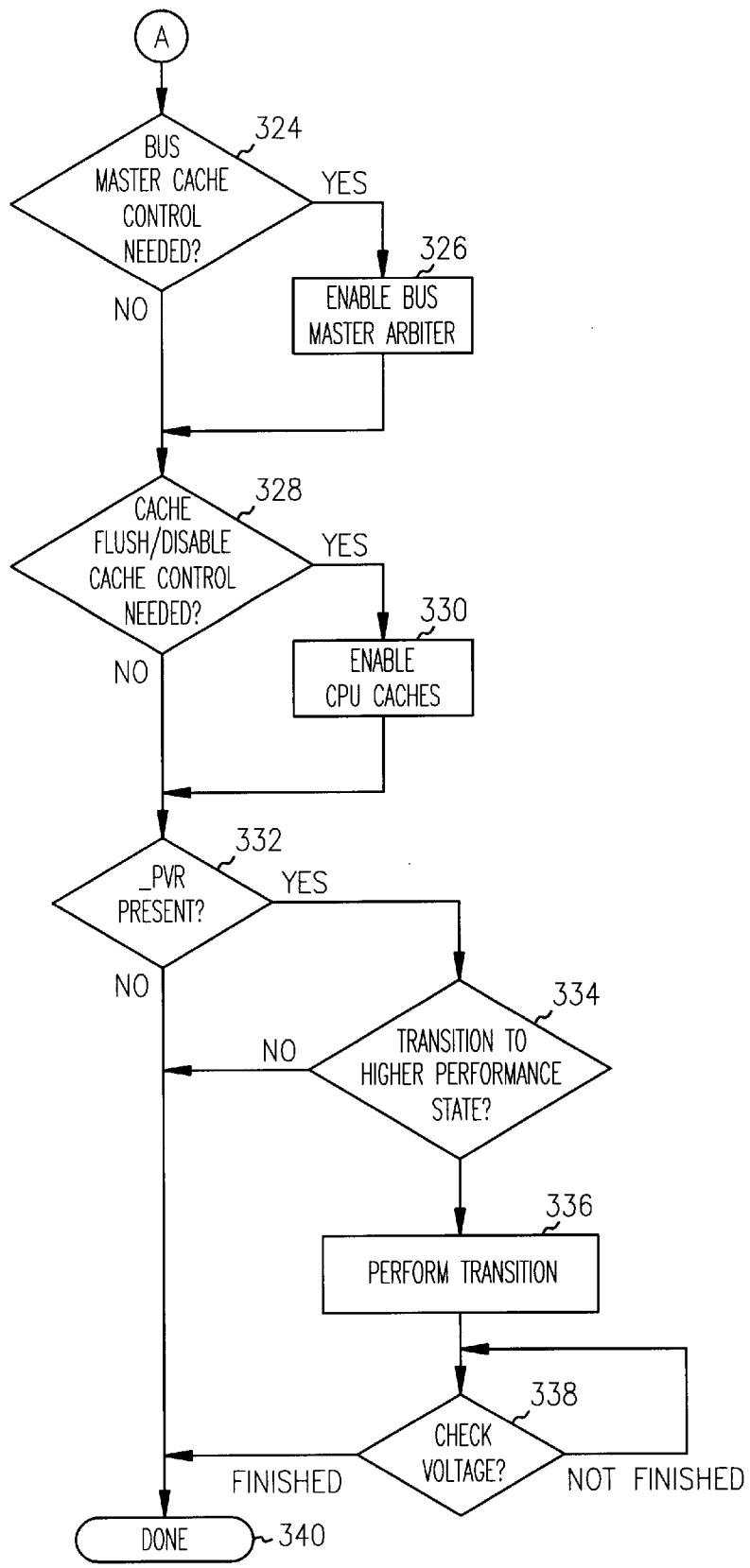

The sequence shown in FIGS. 7a and b describes one approach to a performance transition sequence. Some of the steps are conditionally executed depending upon the type of transition indicated by the objects. (NOTE: The term 'I' is used to represent the number of the state to which the process is changing.)

In FIG. 7a, at 300, a check is made to see if a separate voltage control is needed. If not, control moves to 308. If, however, a separate voltage control is needed, control moves to 302 and a check is made to determine if the transition is to a lower performance state. If so, control moves to 308.

If, however, the transition is to a lower performance state, control moves to 304 and a voltage control value is written to initiate the voltage transition. (For instance, one could write VoltControlI value to the PERF_VCNT register.) Control then moves to 306 and a check is made (e.g., read PERF_VSTS register) to determine if the voltage transition is finished (e.g., compare the value read from the PERF_VSTS register to the VoltStatusI value). If not, control remains at 306 (i.e., in one embodiment, system 10 waits for PERF_VSTS to be equal to VoltStatusI). If, however, the voltage transition is determined at 306 to be finished, control moves to 308.

At 308, a check is made to determine if bus master cache control is needed. If bus master cache control is not needed, control moves to 312.

If, however, bus master cache control is needed, control moves to 310 and system 10 disables the bus master arbiter (e.g., sets PM2_CNT.ARB_DIS). Control then moves to 312.

At 312, a check is made to determine if cache flush/disable cache control is needed. If not, control moves to 318. If, however, cache flush/disable cache control is needed, control moves to 314 and system 10 disables CPU caches and to 316 where system 10 writes-back and invalidates CPU caches. Control then moves to 318.

At 318, system 10 prepares the hardware for the next state transition (e.g., writes a PerfControlI value to the PERF_CNT1 register. Control then moves to 320, where performance transition is initiated (by, e.g., reading the PERF_CNT2 register). Control then moves to 322, where system 10 checks to determine if the performance transition is complete (by, e.g., comparing the value read to a PerfStatusI value). If not, control moves to 318 and system 10 once again prepares the hardware for the next state transition (i.e., repeat until PERF_STS is equal to PerfStatusI).

Control then moves to 324. At 324, if bus master cache control is not needed, control moves to 328. Otherwise, control moves to 326, where system 10 enables the bus master arbiter (e.g., clears PM2_CNT.ARB_DIS). Control then moves to 328.

At 328, if cache flush/disable cache control is not needed, control moves to 332. Otherwise, control moves to 330, where system 10 enables CPU caches. Control then moves to 332.

At 332, if separate voltage control is not needed (_PVR not present), control moves to 340. Otherwise, control moves to 334, where a determination is made as to whether the transition was to a higher performance state. If so, control moves to 340. If not, however, control moves to 336 and system 10 initiates a voltage transition (e.g., writes the VoltControlI value to PERF_VCNT register). Control then moves to 338 where system 10 checks voltage status (read PERF_VSTS register) and compares the value read to a VoltStatusI value. Control remains at 338 until the transition is finished. Control then moves to 340.

Non-ACPI approaches

Although performance state transitions are supported by the ACPI model provided above, older systems do not always support the ACPI model. In some such systems, a driver-based performance state transition support mechanism is needed.

In one embodiment, the driver-based support mechanism for performance state transitions consists of the following two software elements: a user interface and a device driver. In one embodiment, the user interface is an extension of the operating system's configuration/power management application (e.g., the control panel application in MICROSOFT® WINDOWS 98® operating system). In one such embodiment when selected a tab displays three columns of performance configuration parameters. In one embodiment the three columns have the following headings: Battery, AC/Undocked, and AC/Docked.

For each configuration setting, the user selects one of the following modes of operation from a drop down dialogue box: High Performance State, Low Power State and Automatic. The High Performance State option sets the processor into the high voltage/frequency mode. The Low Power State option sets the processor into the low voltage/frequency mode. The Automatic setting causes the mode to be selected automatically based on CPU performance demand.

In another embodiment, specific processor frequencies are listed as options.

A current CPU speed indicator will be displayed in a tab box as follows:

CPU Speed: xxxMHz

In one embodiment an enable/disable check box provides control over the performance state transition feature as follows:

Performance State Transition Feature Control: Enabled/Disabled

In this embodiment, when the Performance State Transition feature is disabled, the configuration parameters and mode settings are grayed and unavailable to the user.

In one embodiment a WDM device driver receives mode commands from the user interface. In one embodiment, mode settings are stored in the system registry. The driver registers for power and plug-and-play notifications, which allow it to detect power source and docking transitions. When the performance state transition feature is disabled, the driver is not used.

In one embodiment, BIOS firmware initializes performance-state-enabled processors in the lowest speed mode. Alternatively, to minimize the risk or impact of a mode change (e.g., lower speed to higher speed) on poorly written device drivers, it may be more effective to have the BIOS set the processor in the highest speed mode during the boot phase and then have the driver set the processor speed consistent with the operating environment.

In one embodiment, the driver operates by intercepting control of the operating systems idle handler. Such an approach gives the driver direct control over the code that performs CPU C state promotion. In one such embodiment, mode changes are effected during normal C3 state transitions by adding pre and post C3 processing. The drawback of such an approach is that a performance application may prohibit the CPU from entering the C3 state during a power or docking transition and as such would require a forced C3 transition to cause a mode change.

In another embodiment, an independent invocation of the C3 state from the driver is required when a mode change is made. The advantages to this approach are that it resolves the performance application problem described earlier and that it is non-intrusive to the original operating system code. The only concern would be the impact of a forced C3 transition asynchronous to the idle code, as well as performing an I/O read of the level three register outside of the operating system's idle handler.

In one embodiment of the automatic mode of operation, CPU speed is adjusted based on the demand placed on the CPU. The device driver detects how "idle" the CPU is by observing the execution of the idle handler. When the system crosses a threshold of non-idleness for a specified time period, the next higher CPU speed is selected automatically. Reductions in CPU speed are handled in a like manner. Because power is consumed in direct proportion to the square of the voltage in CMOS circuits, this capability saves significant power when running on AC/Undocked or AC/Docked.

A third approach to performance state transition control is through system management interrupts (SMI). Problems may occur in non-ACPI environments when switching performance states from within SMI. This is as a result of the dramatic change in CPU performance that occurs across such a transition. As noted above, older operating systems, drivers, and applications may use timing methodologies that calibrate at boot time. These systems, drivers and applications could potentially break down in a performance-state-enabled system where CPU performance is not constant. Although CPU performance has varied due to issues like thermal throttling and power management, the CPU speed was never increased in a particular mobile system. This is why potential operating system problems due to performance state transition technology can be foreseen.

For example, because a performance state transition can increase the CPU speed after bootup calibration has completed, consider what may occur when an AC adapter is inserted after booting from a battery. It is entirely possible that a timing function based upon CPU speed, which was calibrated at the Low Power State, will fail as the CPU speed is increased to a High Performance State.

Figure 8:
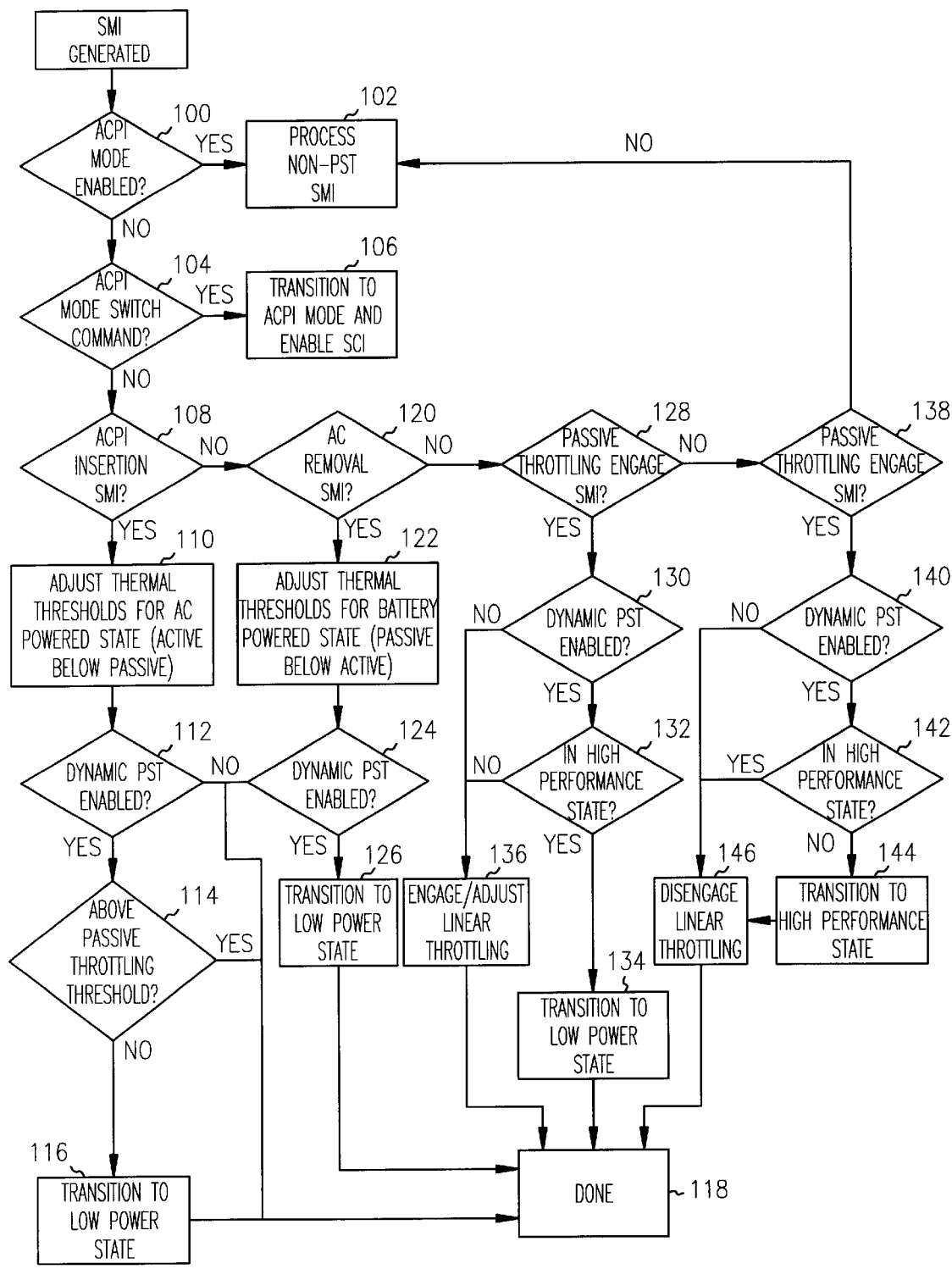
FIG. 8 illustrates use of SMIs to implement performance date transitions.

When using SMIs to implement performance state transitions in legacy operating systems, it is recommended that they be set up on all pertinent events (e.g., AC insertion and removal, passive thermal throttling threshold). In addition, an SMI should be set up to trigger upon a ACPI_ENABLE mode switch command written to the SMI_CMD port. FIG. 8 shows an example of an SMI Handler execution flow.

In the flowchart of FIG. 8, a check is made at 100 to determine if ACPI mode is enabled. If so, control moves to 102 and any non-performance state transition SMIs are executed. If, however, ACPI mode is disabled, control moves to 104 and a check is made to determine whether the operating system has received an ACPI mode switch command. If so, control moves to 106 and system 10 transitions to ACPI mode and enables SCI.

If at 104, a determination is made that this is not an ACPI mode switch command, control moves to 106 and a determination is made whether the SMI was generated by AC insertion. If so, control moves to 110 and the thermal thresholds are adjusted for the AC-powered state. Control then moves to 112 and a determination is made whether dynamic performance state transitions are enabled. If not, control moves to 118 and execution is done. If, however, at 112 a determination is made that dynamic performance state transitions are enabled, control moves to 114 and a determination is made as to whether the temperature is above the passive throttling threshold. If not, control moves to 116 and the CPU is transitioned to a higher performance state.

If at 108, however, the operating system determines that it has not received an AC insertion SMI, control moves to 120 where a determination is made whether the operating system has received an AC removal SMI. If so, control moves to 122 and the thermal thresholds are adjusted for the battery-powered state. Control then moves to 124 and a check is made as to whether dynamic performance state transitions are enabled. If not, control moves to 118.

If at 124, a determination is made that dynamic performance state transitions are enabled, control then moves to 126 and the CPU is transitioned to the lowest power state. Control then moves to 118.

If, however, at 120 a determination is made that this is not an AC removal SMI, control moves to 128 and a determination is made as to whether the operating system has received a passive throttling engage SMI. If so, control moves to 130 and a determination is made whether dynamic performance state transitions are enabled. If so, control moves to 132 and a determination is made as to whether the CPU is in a high performance state. If so, control moves to 134 and the CPU is taken to the lowest power state. Control then moves to 118.

If at 130, a determination is made that dynamic performance state transitions are not enabled, control moves to 136 and linear throttling is engaged or adjusted. Control then moves to 118. Likewise, if at 132, a determination is made that the CPU is not in a high performance state, control moves to 136.

If at 128, a determination is made that a passive throttling engage SMI was not received, control then moves to 138 and a determination is made as to whether a passive throttling disengage SMI has been received. If not, control moves to 102 and a non-PST SMI is executed. If, however, a determination is made that a passive throttling disengage SMI has been received, control moves to 140 and a determination is made as to whether dynamic performance state transitions are enabled. If so, control moves to 142 and a check is made to determine whether the CPU is in one of the high performance states. If not, control moves to 144 and the CPU is transitioned to one of the high performance states. Control then moves to 146 and linear throttling is disengaged. Control then moves to 118.

If at 140, a determination is made that dynamic performance state transitions are not enabled, control moves directly to 146 where linear throttling is disengaged. Control then moves to 118. Likewise, if at 142, a determination is made that the CPU is in one of the high performance states, control moves to 146 and linear throttling is disengaged before control moves to 118.

The flowchart in FIG. 8 shows that for an ACPI_ENABLE command, the SMI handler should immediately cease all performance state transition management activities. This means that SMIs due to AC adapter insertion/removal events and passive throttling threshold traversals should be disabled and/or reprogrammed to generate SCIs. Upon an AC adapter insertion event, the SMI handler should first adjust the thermal thresholds. This is typically done to switch system 10 into an active-preferred cooling policy where the active thresholds are moved down in temperature below the passive threshold. This is an important step; it may be necessary for an active device to begin running almost immediately. Dropping the active threshold for that device below the current temperature can also easily accommodate this. The next step for the SMI handler is to check if dynamic performance state transitions are enabled from the BIOS setup (if implemented). If dynamic performance state transitions are not enabled, the SMI handler is done. If dynamic performance state transitions are enabled, the SMI handler should then check to see if the system temperature is above the passive threshold. The SMI handler should then initiate a transition to the High Performance State if and only if the system is not above a passive trip point.

Upon an AC adapter removal event, the SMI handler should adjust the thermal thresholds to a passive-preferred cooling policy. This is one where the passive threshold is moved down to a lower temperature below the active cooling devices such that the system will throttle the CPU as the first step in the thermal management process. After this step is performed, the SMI handler should check to make sure that dynamic performance state transitions are enabled before transitioning the system to the Low Power State. Upon a passive thermal event, the SMI handler should first determine if it is an engage passive thermal management event (temperature is greater than passive threshold), or if it is a disengage passive thermal management event (temperature is less than passive threshold). If it is an engage passive thermal management event and dynamic performance state transitions are disabled, the SMI handler should immediately engage standard throttling. If dynamic performance state transitions are enabled, the SMI handler should perform a transition to the Low Power State if the system was previously in the High Performance State. If the system is already in the Low Power State and dynamic performance state transitions are enabled, the SMI handler should engage standard throttling.

In the case that the temperature is below the passive thermal threshold, the SMI handler should first check if dynamic performance state transitions are enabled. If it is not, the SMI handler should simply turn off normal throttling and exit. If dynamic performance state transitions are enabled, the system should transition to the High Performance State, disengage normal throttling, and exit.

In one embodiment, a software architecture is provided that allows for control of performance state transitions by any of several different software components. Such an architecture is shown in FIG. 9.

Figure 9A:
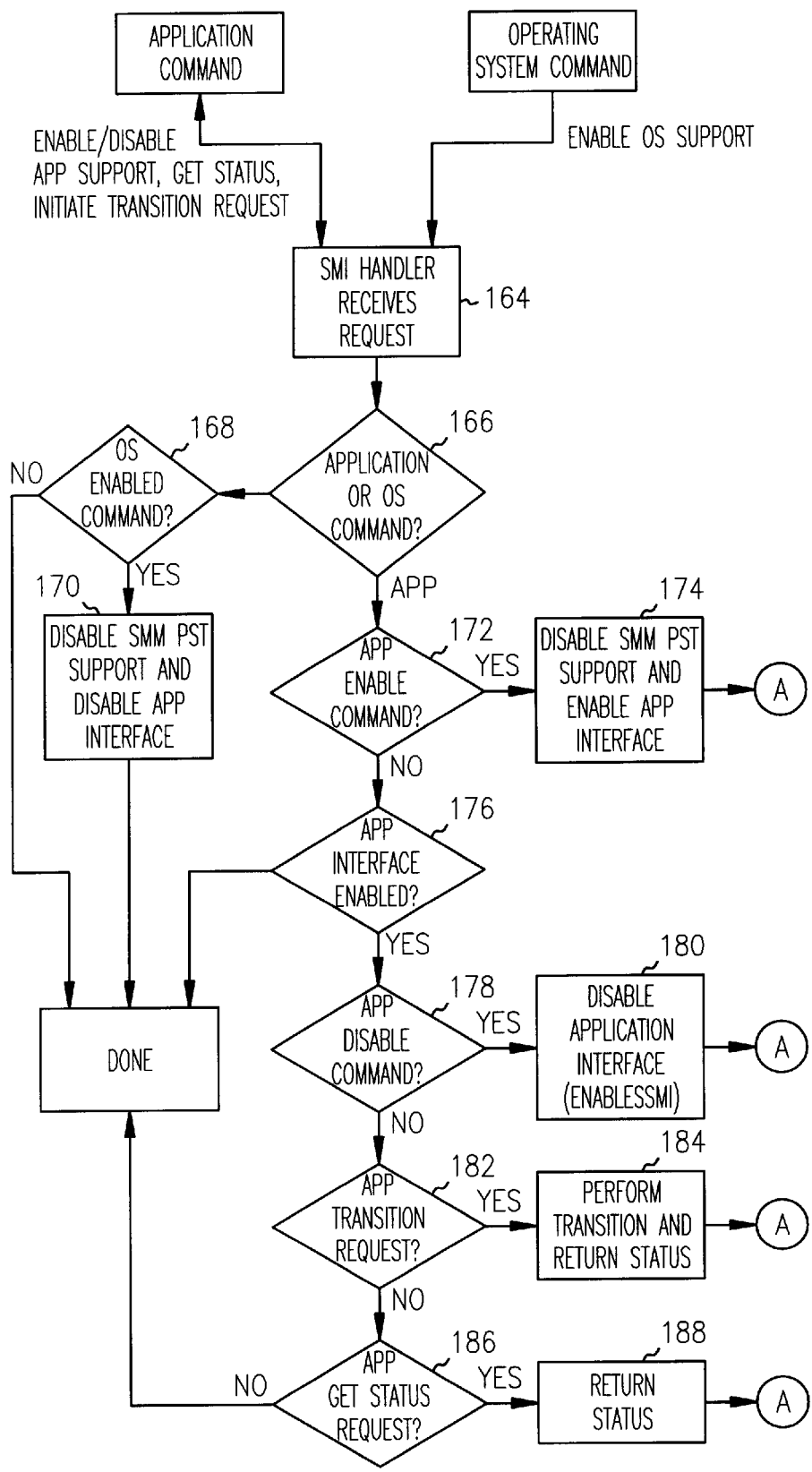
FIG. 9 illustrates an alternate operating system policy scheme for managing performance state transitions.
Figure 9B:
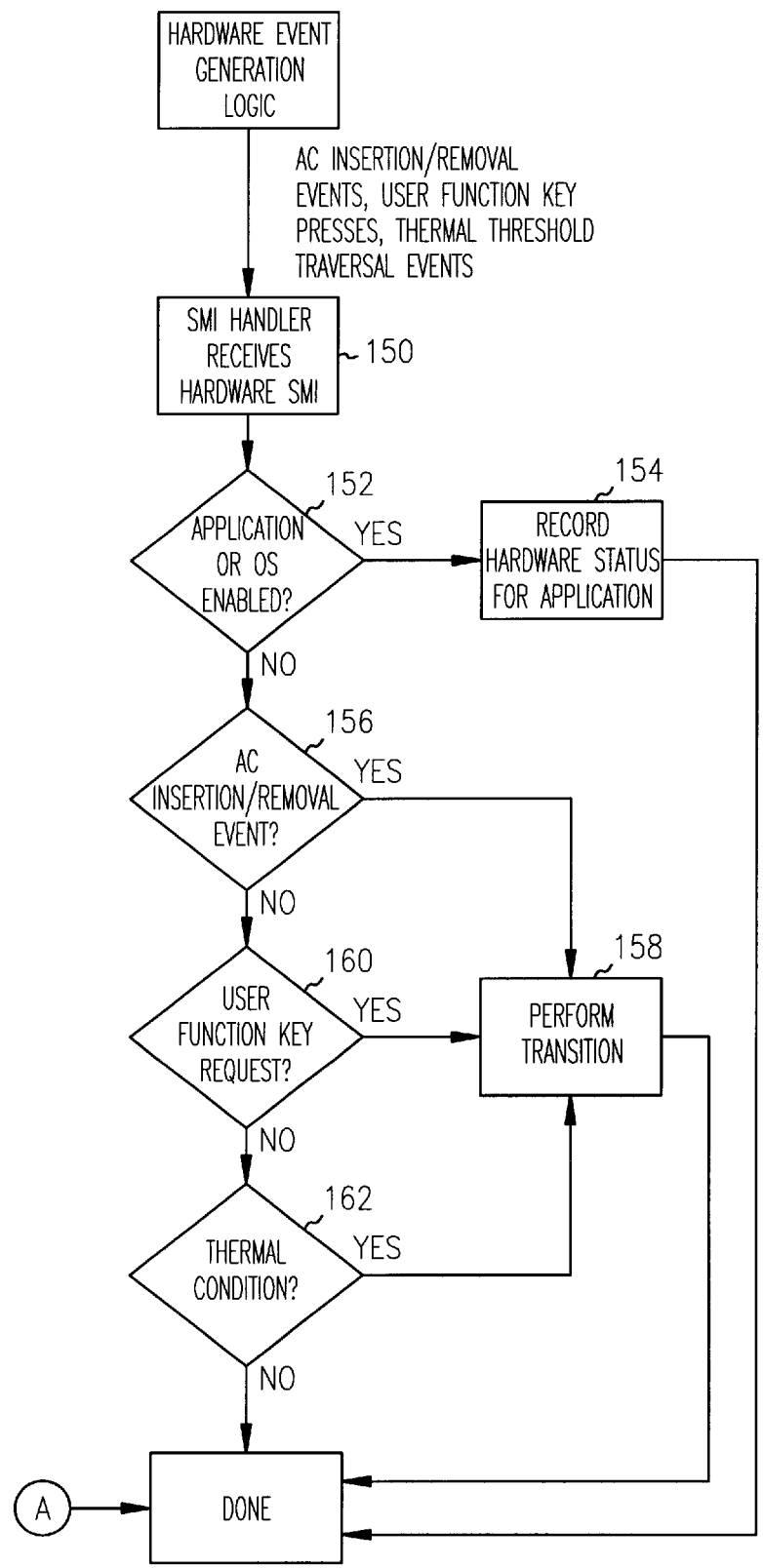

The architecture of FIG. 9 allows three software support models to coexist together. In one embodiment, the SMI handler defaults to owning the transition policy. In the SMI mode of operation, the SMI handler initiates performance state transitions in response to hardware events. If, for example, the AC power supply is attached and no thermal or user interaction events are noted, the SMI handler will initiate a transition to a higher performance state. If the SMI handler receives a thermal event, it can implement thermal management as detailed below. If the SMI handler receives a user function key event, it can restrict operation to low performance state only, or allow high performance operation while battery powered (in the event that there are no thermal issues to contend with).

In one embodiment, as is shown in FIG. 9, at 150 the SMI handler receives a hardware SMI. The SMI handler checks at 152 to determine if application or operating system control of the performance state transitions is enabled. If so, control moves to 154 and the hardware status is recorded for access by the operating system or the application.

If application or operating system control of the performance state transitions is not enabled, control moves to 156 and a check is made as to whether this is an AC insertion/removal event. If so, control moves to 158 and the performance state is adjusted accordingly.

If this is not an AC insertion/removal event, control moves to 160 and a check is made to determine if this is a user function key request. If so, control moves to 158 and the performance state is adjusted accordingly.

If this is not a user function key request control moves to 162 and a check is made to determine if the hardware SMI was generated by a thermal condition. If so, control moves to 158 and the performance state is adjusted accordingly. Otherwise, the process is done.

As is noted above, if a performance state transition enable command is issued, the SMI handler ceases owning the transition policy and simply records the status of hardware events as they are received. Once a performance state transition application has been granted the transition interface, the application periodically queries the SMI handler for system status. These status calls return information such as the status of AC and dock, number of transition states available, user configuration settings, and the current operating state and frequency. In one such embodiment, the application reads the user configuration settings from a control panel user interface. By using all of this data, the application can then request that the SMI handler perform a transition to a given performance state. The SMI handler registers these requests and attempts a transition, returning status (success/failure) to the application. The application can then note the new performance state and update the user interface, or retry the operation at a later time if it failed.

One method of communicating with the SMI handler is shown in FIG. 9. At 164, the SMI handler receives a request from the application or the operating system. Control moves to 166 and a check is made to determine if the request is an application or an operating system command. If it is an operating system command, control moves to 168 and a determination is made as to whether the command is an operating system enable command. If not, the process is finished.

If, however, it is determined that the command is an operating system enable command, control moves to 170 and SMM support for performance state transitions is disabled, as is the application interface.

If, however, at 166, the request is an application command, control moves to 172, where a determination is made as to whether the command is an application enable command. If so, control moves to 174, where SMM support for performance state transitions is disabled and the application interface is enabled.

If the command is not an application enable command, control moves to 176, where a check is made to determine if application control of performance state transitions is enabled. If not, the process is finished.

If, however, application control of performance state transitions is enabled, control moves to 178, where a determination is made as to whether the request is an application disable command. If so, control moves to 180, the application is disabled and the SMI interface is enabled.

If, however, the request is not an application disable command, control moves to 182, where a determination is made as to whether the request is an application transition command. If so, control moves to 184 and the system performs a performance state transition.

If, however, the request is not an application transition command, control moves to 186, where a determination is made as to whether the request is an application get status request. If so, control moves to 188 and the SMI handler returns status to the application.

In one embodiment, when a performance state transition-enabled operating system is loaded, it detects the performance state transition capability of system 10 through ACPI mechanisms. It can then issue a command to the SMI handler to disable SMI-based support. This command will cause the SMI handler to cease managing performance state transitions, as well as effectively disabling the SMI interface to the performance state transition application. If the application is already loaded, the application receives a status bit in the periodic status function that the operating system is now in control of transitions. If the application loads after the OS has enabled native transition support, the enable performance transition application interface will fail the request. In either case, the application will unload once the OS has taken control of the transition function.

Performance State Transitions

In one embodiment, system 10 performs transitions in response to requests from system BIOS during BIOS POST, from SMI handler firmware during runtime, and from applets (via SMI handler) during runtime. Such an approach incorporates the routine into the system BIOS segment for use during these periods, as this location makes it easily accessible by system BIOS and SMM handler firmware. This requires that the SMM handler perform a far call to the transition routine with the segment registers setup appropriately. In one embodiment this is handled by a wrapper routine that performs the segment loading.

The following sequence describes the sequence of steps needed in performing a performance state transition in a system having a processor modeled after the Intel® family of processors. First, the CPU must check the current CPU performance state. This is a necessary check to ensure that the CPU is not already in the requested performance state. Performing a performance state transition while the CPU is already in the requested state could result in a VRChgng# break event interrupt. In one embodiment, such an interrupt causes system 10 to do a C3 transition that results in the processor and bus master arbiter being turned off for an extensive amount of time.

Because performance state transitions do not necessarily occur while the system is idle (as is done for C3 entries), this long duration in C3 can potentially cause system failure.

Second, perform PIIX4 IDE Bus Master Abort. This step is necessary for all generations of PIIX4 I/O controllers, and is a necessary step in preventing system hang.

This step involves finding the base I/O address of PIIX4 IDE registers by reading function one (IDE) PCI configuration space. This step is necessary on each transition attempt, as the operating system can relocate the IDE I/O space at anytime. Once found, the transition routine then reads the bus master IDE active bits to ensure that they are both clear. If either bit is set, indicating bus master IDE activity, the transition attempt must be aborted, and a failure code is returned to the caller.

Third, save the power management registers. This step is needed to make sure that the SMI handler performance state transition routine does not corrupt any power management registers used by an ACPI compliant operating system. This is because it is possible that the SMI handler (via an applet or otherwise) can preempt the operating system when it is relying upon the values in the power management register space. As a result of this, it is necessary to save the power management registers used by the performance state transition itself.

Fourth, write to the performance state control field. This sets the requested transition routine next state value onto the LO/HI# pin that feeds the transition control logic. In one embodiment, this maps to a general-purpose output port. Setting this signal to a different state prepares the control logic to perform a performance state transition on the next entry into deep sleep.

Fifth, disable bus master reload. This step disables the ability of the PIIX4 chipset component to generate a break event in response to a bus master request while performing the performance state transition. This step is important in order to make sure that performance state transitions complete successfully in the presence of intensive bus master activity.

Sixth, disable the bus master arbiter. This step is necessary to ensure that the CPU's caches remain coherent while the CPU is in the deep sleep state and is unable to snoop its caches. Cache coherency is maintained by ensuring that no other agents can have bus ownership and run cycles to main memory. The 443BX memory controller has an arbiter disable bit that prevents AGP and PCI devices from receiving bus ownership grants for the duration of the transition into deep sleep.

Seventh, clear the break event. This step ensures that the break event used to connect the performance state control logic break event signal (VRChgng#) is clear, such that it can indeed generate the necessary break event upon performance state transition completion.

Eighth, perform a level three read. This step triggers entry into the C3 clock control state. Once the PIIX4 enters the C3 state as indicated by the CPU_STP# signal, the performance state control logic initiates a performance state transition. It is possible, however, that the system will not fully enter the C3 state as a result of a level three read. For example, a problem may arise if a break event (like system IRQ) is received before the assertion of SUS_STAT1# in the transition sequence.

Ninth, restore the power management registers. This step restores the values of the power management registers used by the transition routine as saved by step #3 above.

Tenth, check CPU performance state. This step is performed to see if the transition was successful. By reading CPU model specific registers indicating the current bus ratio, the transition routine is able to detect whether the transition was successful or not. If it was not, a failure error code is returned to the caller; otherwise a success code is returned.

SMI Handler for Performance State Transition Processing

The SMI handler performs several important tasks for managing a performance-state-enabled system. The first is that it provides the interface to the Performance State Transition Applet for reading status, checking and setting capabilities, and performing transitions. In one embodiment, the SMI handler controls the transition function directly. This mechanism should only be used for development purposes, and should be used with caution. Lastly, the SMI handler is responsible for receiving SMIs in response to AC insertion/removal events in order to report this information to the Performance State Transition Applet.

The following components are covered in this implementation: the Performance State Transition Applet SMM Interface and the State Transition Event Handlers. The Performance State Transition Applet SMM Interface routine processes software SMIs from the Performance State Transition Applet, or in response to transition enable/disable commands from the operating system.

The State Transition Event Handlers routines perform the necessary transition processing in response to AC insertion/removal events, dock/undock completion events, and timer SMIs. Timer SMIs are used to retry performance state transitions in the event of unsuccessful transition attempts when the performance state transition policy is under complete SMM control.

In one embodiment, the Performance State Transition Applet SMM Interface is accessed as a hook to the processing of generic software SMIs. In one such embodiment, a SwSmi routine is added as an initial check in the processing of software SMIs. The routine returns with carry clear if the SMI was not caused by one of two performance state transition software SMI commands.

In one embodiment, operation requires that two values be defined to be reserved for performance state transition control. These commands are the Disable Performance State Transition command, which is called by an ACPI operating system attempting to manage transitions directly, and the Performance State Transition Applet. If any other command value has been written to the SMI command port, it is the responsibility of the SMI handler to process it. If the Disable Performance State Transition command was issued, the SMI handler will cease managing performance state transitions on its own, and cease responding to Performance State Transition Applet requests. This value is reserved for OS use once native support for performance state transitions has been added to the operating system. This value is reported to the OS in the ACPI tables in a currently reserved location of the Fixed ACPI Description Table (FACP).

The value for the Performance State Transition Applet indicates a subset of commands that are decoded by the SMM handler. These commands are further defined by decoding values stored in the CPU's general-purpose registers. The next section describes this command interface in detail.

The SMM event handlers are the second part of the SMI handler implementation that is required for performance state transition control. These event handlers operate in two modes, depending upon whether: the OS is in control (as indicated by issue of a Performance State Transition Disable command) or the Performance State Transition Applet is in control (as indicated by an Applet Enable command).

When the OS or Transition Applet is in control, the SMM handler simply notes the state of AC and dock, and resumes the CPU. It must not perform any performance state transitions in this mode, as the OS or applet is in control. When neither the OS nor applet interface is in control, the SMM handler can perform performance state transitions in response to AC or dock event changes. However, the SMM handler must not violate the 500-microseconds guideline for maximum SMI handler execution time. As a result of this guideline, in one embodiment the SMI handler cannot retry a failed performance state transition. It must setup a timer SMI to retry the event at a later time. This is accomplished in this reference example by using an SMI timer in PIIX4. This software timer is setup to trigger every 16-milliseconds, at which time the SMI handler retries the performance state transition. Once the transition is successful, the software SMI timer is disabled.

In one embodiment, performance state transition systems are supported on WINDOWS 95, WINDOWS NT 4.0, WINDOWS 98 and WINDOWS 2000 operating system via an SMM-based interface. An applet is provided that communicates to the platform system management interrupt (SMI) handler to receive status changes as well as initiate performance state transitions. In one such embodiment, the SMI handler performs all performance state transitions so that it can insure that OS registers are properly saved/restored in order to prevent collision with accesses by an ACPI-compliant operating system.

In another embodiment, performance state transitions are supported by native ACPI OS code. In these cases, the OS writes a value to the SMI command port to tell the SMI handler to cease performing performance state transitions.

In one embodiment, static usage models are applied to operating systems other than WINDOWS 98 and WINDOWS 2000. This is because legacy non-ACPI compliant operating systems used CPU speed dependent calibration loops for driver timing routines. The current performance state transition technology changes the CPU speed, which can degrade timing loops resulting in operating system failure.

There are three distinct support models for Performance State Transition Technology:

1) SMI only—This solution, which, in one embodiment, is for development purposes only, enables the SMI handler to manage performance state transitions independent of the operating system. In this case, the SMI handler reads BIOS setup options at boot, and begins managing the CPU performance state. The SMI handler uses such inputs as end user preference (performance or battery life), hot key overrides, and AC adapter status to initiate performance state transitions. The SMI handler must cease performing performance state transitions once an ACPI OS writes the performance state disable command to the SMI command port. This mode should be disabled in any production level system.

2) SMI+Applet (ACPI compliant operating systems). In these cases, the BIOS can setup the initial CPU speed at boot (e.g., perform a static performance state transition), but the SMI handler cannot perform such transitions on the system until the applet communicates transition events to SMI. Dynamic performance state transition support is restricted to operating systems that don't contain CPU speed-dependent calibration loops. In one embodiment, the SMI handler ceases performing performance state transitions in response to applet requests once an ACPI OS writes an appropriate disable command to the SMI command port.

3) SMI+Applet (legacy non-ACPI compliant operating systems). A one-time transition from high to low frequency is provided. In this case, the BIOS sets up the initial CPU speed at boot. The applet detects the operating system and can allow a single transition on AC removal. The user is prompted for system restart upon AC insertion.

In one embodiment, two SMI command port values are reserved for the performance state transition function. The first is the performance state transition disable command. This value will be incorporated into a future revision of the ACPI specification to allow the OEM to provide a disable value in the FACP table currently marked as reserved. This will allow future operating systems to disable the performance state transition feature when they incorporate native transition support. As with all other ACPI commands to SMI, the SMI handler simply compares the value written to the SMI command port to the value reported in the FACP table, and disables performance state transitions from that point on.

The second SMI command port value is used for the performance state transition applet interface. In this case, in order to claim only one additional SMI command port value and to ensure reliable operation, general purpose registers of the CPU are used to present a signature, command, and data value to the SMI handler. In addition, the SMI handler indicates return values in the general-purpose registers and clears the SMI command port upon completion of the requested command.

To keep the interface isolated from collisions from ACPI OS commands, in one embodiment the interface uses only one register to initiate the SMIs. In addition, returned data is reported back in the general purpose registers in order to ensure that the OS doesn't preempt the applet and corrupt the SMI command or status port. Once a command is written to the SMI command port, the applet acts upon the results of the general-purpose registers. For instance, in one embodiment the applet checks the SMI command by verifying that the signature bits of the EAX register [31-8] have been cleared by the SMI handler. Any value other than zero indicates the command failed and the procedure should be aborted. Once the applet has verified that the signature bits of the EAX register are zero, it may act on the data returned in the EBX, ECX and EDI registers.

In one embodiment, the following commands can be used to communicate with the SMM interface: Performance State Disable, Performance State Control, Get Performance State Status, Set Performance State, and Set Performance State Setup.

Performance State Disable allows the OS to manage performance state transitions. SMI only responds to Get Performance State Status function calls and reports to the applet that OS native support is enabled.

Performance State Control allows the applet to manage performance state transition. In one embodiment, this command has two subfunctions that allow the applet to enable and disable the SMM interface. However, the Get Performance State Status function is always enabled.

The Get Performance State Status call reports to the applet software the current CPU state, the maximum number of states that the platform is capable of supporting, the number of states that are currently available, whether the platform is capable of performance state transitions, which setup mode the user has selected, AC status, and the revision of the SMM Interface it is compliant with. (NOTE: This function must maintain memory copies of all variables to ensure this function returns as quickly as possible.)

The Set Performance State call causes the SMI handler to initiate a transition to the requested state. The SMI handler attempts the transition one-time and returns status indicating success, abort, or error code to the applet.

The Set Performance State Setup call causes SMI to attempt to save changes in NVRAM to the user BIOS setup options to reflect changes made by the user in the applet user interface. The setup options include disabling performance state transitions, operating in one particular state all of the time, reversed or automatic operation.

The Get Performance State Status function is called frequently relative to other SMI commands. Because of the overhead of SMI, in one embodiment the applet is configured to use an event port that is polled on a periodic basis rather than SMI. The data located at the event port can then be changed by the platform firmware to indicate that a status change has occurred. When the applet detects a change in value of the data on the event port, the applet will issue a Get Performance State Status function call to verify exactly what (if anything) has changed and act upon the results. This effectively reduces the number of SMIs in the system.

Thermal Management Through Performance State Transitions

Mobile systems often rely upon software-controlled thermal management solutions in order to operate efficiently within a varying group of thermal constraints. For instance, the ACPI specification defines several thresholds that indicate temperatures at which different forms of software-controlled thermal management are activated. Active thresholds (indicated by _ACx objects) define temperatures for a given thermal zone. When this threshold is exceeded, the OS activates an active device such as a fan, remote heat exchanger, or reduces the battery charge current.

Similarly, a performance-state-enabled system can use one or more active thresholds to engage active thermal management at the appropriate temperatures. Passive thresholds (indicated by _PSV objects) define a temperature at which the power of one or more CPUs should be reduced in order to cool a given thermal zone. As noted above, ACPI defines a model that allows the operating system to vary CPU duty cycles so the power dissipation of the CPU matches the power dissipation capabilities of the system. This type of thermal management is known as "throttling" or termed "Passive Cooling" in ACPI Rev 1.0. In order to accomplish throttling, ACPI defines registers that allow the OS to control the duty cycle of the CPU.

Performance state transitions offer another method for passive thermal management. By switching between the Low Power State and a High Performance State, system 10 can be used to attain maximum performance subject to thermal constraints. The thermal management software can be designed such that the CPU will spend an amount of time in the Low Power State and rest of the time in the High Performance State, effectively delivering a level of performance and power consumption that lies between the two operating points. This type of thermal management will be referred to as "cycling". Cycling is described further in U.S. Pat. No. 6,442,700, the disclosure of which is incorporated herein by reference.

In one embodiment, system 10 uses cycling as the first stage of passive thermal control. If more control is needed, in one embodiment cycling is followed by throttling from the Low Power State. This ensures that the OS does not inefficiently throttle from the High Performance State.

Because of the large number of parameters involved, the policy for managing the CPU performance state and throttling level can be complicated. For example, the user performance policy can be used to affect the responsiveness of the CPU to changes in performance. If the user has selected high performance, the CPU should quickly transition to higher performance states. In addition, the user's preference could be used to set a time interval at which the averaging of the CPU workload occurs. This sampling interval is the same interval at which the OS will determine whether a transition is necessary.

In another example, the efficiency of each state can be used to set a demand threshold. A demand threshold is a percentage that when traversed, triggers a transition to the next higher (or lower) performance state. For instance, if system 10 had a very efficient high performance state, the demand threshold might be set at 50%, whereas for a system 10 with a very inefficient high performance state, the demand threshold might be set at 95%. The user's preference in this case would select the sampling or average period. In one embodiment, the period would vary from 10-milliseconds to 10-seconds. In one graphical embodiment, a slider bar could be used to allow the user to select a continuum of performance preference.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a computer system having a processor capable of operating at a plurality of performance states, including a first and a second performance state, wherein while the processor operates in any of the performance states it executes tasks at an expected processing performance, a method of dynamically adjusting to transitions between the first and second performance states, comprising:
   halting task scheduling;
   measuring CPU performance at the second performance state;
   resuming task scheduling; and
   adjusting tasks as a function of CPU performance at the second performance state, wherein adjusting includes;
      notifying each task executing real-time threads of the transition between performance states; and
      modifying execution of the tasks executing real-time threads to correct for performance state dependencies in execution of the tasks by a processor operating at the second performance state.

2. The method of claim 1, wherein adjusting tasks further includes adjusting software delay routines as a function of CPU internal frequency.

3. The method of claim 1, wherein adjusting tasks further includes allocating available bandwidth among threads.

4. The method of claim 3, wherein allocating available bandwidth includes dynamically rescaling bandwidth allocated to each real-time thread.

5. The method of claim 3, wherein allocating available bandwidth includes dynamically rescaling bandwidth allocated to each real-time thread each time a thread is engaged.

6. The method of claim 3, wherein allocating available bandwidth includes dynamically rescaling bandwidth allocated to each real-time thread each time a thread is destroyed.

7. The method of claim 3, wherein allocating available bandwidth includes dynamically rescaling bandwidth allocated to each real-time thread each time throttling of the processor is engaged.

8. The method of claim 3, wherein notifying each task includes dynamically rescaling bandwidth allocated to each real-time thread each time a thread is destroyed.

9. The method of claim 3, wherein notifying each task includes dynamically rescaling bandwidth allocated to each real-time thread each time throttling of the processor is engaged.

10. The method of claim 1, wherein notifying each task includes dynamically rescaling bandwidth allocated to each real-time thread each time a thread is engaged.

11. A computer system, comprising:
    memory;
    a processor connected to the memory, wherein the processor includes a performance control input and wherein the processor is capable of operating at a plurality of performance states, including a first and a second performance state;
    performance control logic connected to the performance control input of the processor, wherein the performance control logic shifts the processor between the first and second performance states as a function of a signal applied to said performance control input; and
    a notification mechanism for notifying processes that use real-time threads so that the processes can adjust to performance state changes, wherein the notification mechanism includes means for measuring CPU performance at the second performance state and means for communicating the measured CPU performance to processes that use real-time threads.

12. The computer according to claim 11, wherein the notification mechanism is a Notify0 operation.

13. The computer according to claim 11, wherein the notification mechanism operates under system firmware control.

14. The computer according to claim 11, wherein the processor shifts between performance states as a function of a voltage level applied to the performance control input.

15. The computer according to claim 11, wherein the processor shifts between performance states as a function of the frequency of a periodic waveform applied to the performance control input.

16. The computer according to claim 11, wherein the processor shifts between performance states as a function of the frequency of a periodic waveform applied to the performance control input and as a function of a voltage level applied to the performance control input.

17. A computer system, comprising:
    memory;
    a processor connected to the memory, wherein the processor includes a power input and a clock input and wherein the processor is capable of operating at a plurality of performance states, including a first and a second performance state;
    performance control logic connected to the clock input of the processor, wherein the performance control logic shifts the processor between the first and second performance states as a function of a signal transmitted to said clock input; and
    a notification mechanism for notifying processes that use real-time threads so that the processes can adjust to performance state changes, wherein the notification mechanism includes means for measuring CPU performance at the second performance state and means for communicating the measured CPU performance to processes that use real-time threads.

18. The computer system according to claim 17, wherein the notification mechanism is a Notify0 operation.

19. The computer system according to claim 17, wherein the notification mechanism operates under system firmware control.

20. The computer system according to claim 17, wherein the performance logic includes power control logic, wherein the power control logic adjusts power supplied to the power input.

21. A computer-readable medium for use in a computer system having a processor capable of operating at a plurality of performance states, including a first and a second performance state, comprising:

program code for switching between the first and second performance states;

program code for halting task scheduling;

program code for measuring CPU performance at the second performance state;

program code for resuming task scheduling; and program code for adjusting tasks as a function of CPU performance at the second performance state, wherein the program code for adjusting tasks includes program code for notifying each task executing real-time threads of the transition between performance states and program code for modifying execution of the tasks executing real-time threads to correct for performance state dependencies in execution of the tasks by a processor operating at the second performance state.

22. The medium according to claim 21, wherein the program code for adjusting tasks further includes program code for adjusting software delay routines as a function of CPU internal frequency.

23. The medium according to claim 21, wherein the program code for adjusting tasks further includes program code for allocating available bandwidth among threads.

24. An operating system, comprising:

a scheduler, wherein the scheduler schedules threads;

a performance state transition controller, wherein the performance state transition controller controls changes between performance states; and a notification mechanism for notifying processes that use real-time threads so that the processes can adjust to performance state changes, wherein the notification mechanism includes means for measuring CPU performance at the second performance state and means for communicating the measured CPU performance to processes that use real-time threads.

25. The operating system of claim 24, wherein the scheduler operates in cooperation with the notification mechanism to allocate available bandwidth to the threads.

\* \* \* \* \*

UNITED STATES PATENT AND TRADEMARK OFFICE
CERTIFICATE OF CORRECTION

PATENT NO. : 6,823,516 B1  
APPLICATION NO. : 09/371751  
DATED : November 23, 2004  
INVENTOR(S) : Cooper Page 1 of 2

It is certified that error appears in the above-identified patent and that said Letters Patent is hereby corrected as shown below:

On the face page, in field (56), under "U.S. Patent Documents", in column 1, line 1, above "5,027,273" insert --5,021,679   6/91   Fairbanks et al.   307/66--.

On the face page, in field (56), under "U.S. Patent Documents", in column 1, line 1, below "5,027,273" insert --5,153,535   10/92   Fairbanks et al.   331/143--.

On the face page, in field (56), under "U.S. Patent Documents", in column 1, line 2, above "5,319,772" insert --5,307,003   04/94   Fairbanks et al.   323/222--.

On the face page, in field (56), under "U.S. Patent Documents", in column 1, line 6, below "5,511,205" insert --5,627,412   05/97   Beard   307/82--.

On the face page, in field (56), under "U.S. Patent Documents", in column 1, line 7, above "5,760,636" insert --5,752,011   05/98   Thomas   395/556--.

On the face page, in field (56), under "U.S. Patent Documents", in column 1, line 12, above "5,994,844" insert --5,974,557   10/99   Thomas et al.   713/322--.

On the face page, in field (56), under "U.S. Patent Documents", in column 2, line 4, above "6,219,742" insert --6,216,235   04/01   Thomas et al.   713/501--.

On the face page, in field (56), under "U.S. Patent Documents", in column 2, line 7, below "6,418,535" insert --6,487,668   11/02   Thomas   713/322--.

In column 33, line 44, in Claim 1, delete ";" and insert --:--, therefor.

In column 33, line 67, in Claim 7, delete "resealing" and insert -- rescaling --, therefor.

In column 34, line 4, in Claim 8, delete "resealing" and insert -- rescaling --, therefor.

Signed and Sealed this  
Thirtieth Day of August, 2011

David J. Kappos  
*Director of the United States Patent and Trademark Office*

CERTIFICATE OF CORRECTION (continued)
U.S. Pat. No. 6,823,516 B1

In column 34, line 7, in Claim 9, delete "resealing" and insert -- rescaling --, therefor.

In column 34, line 11, in Claim 10, delete "resealing" and insert -- rescaling --, therefor.